United States Patent
Baker, Jr. et al.

(10) Patent No.: US 12,318,337 B2
(45) Date of Patent: Jun. 3, 2025

(54) PATIENT TRANSPORT APPARATUS WITH ELECTRO-MECHANICAL BRAKING SYSTEM

(71) Applicant: Stryker Corporation, Kalamazoo, MI (US)

(72) Inventors: Charles Donald Baker, Jr., Portage, MI (US); Krishna Sandeep Bhimavarapu, Kalamazoo, MI (US); William Dwight Childs, Plainwell, MI (US); Tyler Ethen, Portage, MI (US); Kirby M. Neihouser, Francesville, IN (US); Anish Paul, Kalamazoo, MI (US); Lavanya Vytla, McKinney, TX (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/756,212

(22) Filed: Jun. 27, 2024

(65) Prior Publication Data

US 2024/0350341 A1 Oct. 24, 2024

Related U.S. Application Data

(63) Continuation of application No. 17/789,869, filed as application No. PCT/US2020/066767 on Dec. 23, 2020, now Pat. No. 12,053,423.

(Continued)

(51) Int. Cl.
*A61G 7/05* (2006.01)
*B60B 33/00* (2006.01)
*A61G 1/02* (2006.01)

(52) U.S. Cl.
CPC ........ *A61G 7/0528* (2016.11); *B60B 33/0086* (2013.01); *B60B 33/0092* (2013.01);
(Continued)

(58) Field of Classification Search
CPC .......... A61G 7/00; A61G 7/05; A61G 7/0528; A61G 1/0237; A61G 1/0287; A61G 2203/36; B60B 33/0092
See application file for complete search history.

(56) References Cited

U.S. PATENT DOCUMENTS

| 4,667,365 A | 5/1987 | Martinek |
| 5,133,106 A | 7/1992 | Milbredt et al. |

(Continued)

FOREIGN PATENT DOCUMENTS

| CN | 108028005 A | 5/2018 |
| EP | 1782515 B1 | 10/2012 |

(Continued)

OTHER PUBLICATIONS

Del City, "Wire Loom Routing Clips Webpage", <https://www.delcity.net/store/Wire-Loom-Routing-Clips/p_800840.h_8008-41.r_IF1003?mkwid=s&crid=38094426869&mp_kw=&mp_mt=&gclid=EAlalQobChMI94qgm-a6R4QIVBA1pCh3H3AWqEAQYBSABEgKjvPD_BwE>, 2019, 1page.

(Continued)

*Primary Examiner* — Fredrick C Conley
(74) *Attorney, Agent, or Firm* — Howard & Howard Attorneys PLLC

(57) ABSTRACT

A patient transport apparatus includes a base, a patient support deck, a plurality of wheels, a plurality of brakes, and an electro-mechanical braking system. The electro-mechanical braking system includes a linkage, a manual actuator, and an electrical braking assembly. The linkage is operatively coupled to the brakes to place the brakes in a braked state, a released state, or other state. The manual actuator moves the linkage manually to place the brakes in one of the states. The electrical braking assembly includes an actuator (Continued)

assembly that moves the linkage with electrical power to place the brakes in one of the states.

20 Claims, 32 Drawing Sheets

Related U.S. Application Data

(60) Provisional application No. 62/954,765, filed on Dec. 30, 2019.

(52) U.S. Cl.
CPC .......... *A61G 1/0237* (2013.01); *A61G 1/0287* (2013.01); *A61G 2203/36* (2013.01)

(56) References Cited

U.S. PATENT DOCUMENTS

| | | | |
|---|---|---|---|
| 5,244,062 A | 9/1993 | Felton | |
| 5,450,639 A | 9/1995 | Weismiller et al. | |
| 6,321,878 B1 | 11/2001 | Mobley et al. | |
| 6,584,641 B1 | 7/2003 | Milbredt | |
| 6,865,775 B2 | 3/2005 | Ganance | |
| 6,877,572 B2 | 4/2005 | Vogel et al. | |
| 7,159,695 B2 | 1/2007 | Strong | |
| 7,195,253 B2 | 3/2007 | Vogel et al. | |
| 7,200,894 B2 | 4/2007 | Block et al. | |
| 7,273,115 B2 | 9/2007 | Kummer et al. | |
| 7,302,717 B2 | 12/2007 | Reinke et al. | |
| 7,346,942 B2 | 3/2008 | Reinke et al. | |
| 7,406,745 B1 | 8/2008 | Chou | |
| 7,407,024 B2 | 8/2008 | Vogel et al. | |
| 7,480,948 B2 | 1/2009 | Reinke et al. | |
| 7,690,059 B2 | 4/2010 | Lemire et al. | |
| 7,698,760 B2 | 4/2010 | Reckelhoff et al. | |
| 7,810,822 B2 | 10/2010 | Figel et al. | |
| 7,828,092 B2 | 11/2010 | Vogel et al. | |
| 7,950,108 B2 | 5/2011 | Yang et al. | |
| 8,016,301 B2 | 9/2011 | Figel et al. | |
| 8,024,101 B2 | 9/2011 | Froli | |
| 8,051,533 B2 | 11/2011 | Block et al. | |
| 8,205,297 B2 | 6/2012 | Fallshaw et al. | |
| 8,267,206 B2 | 9/2012 | Vogel et al. | |
| 8,341,777 B2 | 1/2013 | Hensley et al. | |
| 8,452,508 B2 | 5/2013 | Frolik et al. | |
| 8,484,802 B1 | 7/2013 | Lin et al. | |
| 8,516,656 B2 | 8/2013 | Lin et al. | |
| 8,528,704 B2 | 9/2013 | Hayes et al. | |
| 8,590,074 B2 | 11/2013 | Hornbach et al. | |
| 8,640,832 B2 | 2/2014 | Chen et al. | |
| 8,701,229 B2 | 4/2014 | Lemire et al. | |
| 8,776,314 B2 | 7/2014 | Hofrichter et al. | |
| 8,789,662 B2 | 7/2014 | Childs et al. | |
| 9,173,795 B2 | 11/2015 | Heidlage et al. | |
| 9,333,801 B2 | 5/2016 | Chen et al. | |
| 9,498,397 B2 | 11/2016 | Hight et al. | |
| 9,555,778 B2 | 1/2017 | Lemire et al. | |
| 10,052,249 B2 | 8/2018 | Elliott et al. | |
| 10,245,886 B2 | 4/2019 | Kloss et al. | |
| 10,437,348 B2 | 10/2019 | Hayes et al. | |
| 10,568,792 B2 | 2/2020 | Derenne et al. | |
| 10,806,653 B2* | 10/2020 | Upchurch | A61G 7/018 |
| 11,135,110 B2 | 10/2021 | Zerhusen et al. | |
| 2001/0011393 A1 | 8/2001 | Brooke et al. | |
| 2002/0174515 A1 | 11/2002 | Strong | |
| 2004/0117943 A1 | 6/2004 | Block et al. | |
| 2004/0181875 A1 | 9/2004 | Shiery et al. | |
| 2010/0138128 A1 | 6/2010 | Strothmann et al. | |
| 2011/0120815 A1* | 5/2011 | Frolik | B60B 33/0081 188/1.12 |
| 2012/0298459 A1 | 11/2012 | Lubbers et al. | |
| 2012/0316686 A1 | 12/2012 | Dueckman | |
| 2013/0111664 A1* | 5/2013 | Childs | B60B 33/026 280/80.1 |
| 2013/0174377 A1 | 7/2013 | Lin et al. | |
| 2014/0109342 A1 | 4/2014 | Hofrichter et al. | |
| 2014/0237721 A1 | 8/2014 | Lemire et al. | |
| 2014/0238784 A1 | 8/2014 | Yeo | |
| 2014/0324315 A1 | 10/2014 | Brondum | |
| 2015/0128346 A1 | 5/2015 | Hollyoak et al. | |
| 2015/0266342 A1 | 9/2015 | Howard et al. | |
| 2016/0193095 A1 | 7/2016 | Roussy et al. | |
| 2016/0296388 A1* | 10/2016 | Hertz | B60B 33/006 |
| 2016/0297242 A1 | 10/2016 | Hein | |
| 2017/0008340 A1 | 1/2017 | Iiyama et al. | |
| 2017/0020752 A1 | 1/2017 | Childs et al. | |
| 2017/0100962 A1 | 4/2017 | Kloss et al. | |
| 2017/0172829 A1 | 6/2017 | Tessmer et al. | |
| 2018/0168897 A1 | 6/2018 | Jonsson | |
| 2019/0192364 A1 | 6/2019 | Upchurch et al. | |
| 2019/0298590 A1 | 10/2019 | Patmore et al. | |
| 2019/0350795 A1 | 11/2019 | Crombie et al. | |
| 2020/0405555 A1 | 12/2020 | Upchurch et al. | |
| 2023/0038537 A1 | 2/2023 | Baker, Jr. et al. | |

FOREIGN PATENT DOCUMENTS

| | | |
|---|---|---|
| EP | 3127522 A1 | 2/2017 |
| TW | M465161 U | 11/2013 |
| WO | 2008148169 A1 | 12/2008 |
| WO | 2013071932 A1 | 5/2013 |

OTHER PUBLICATIONS

English language abstract and machine-assisted English translation for EP 1 782 515 extracted from espacenet.com database on Dec. 9, 2019, 6 pages.

International Search Report for Application No. PCT/US2020/066767 dated Mar. 25, 2021, 1 page.

McMaster-Carr, Push-In Rivets with Ribbed Shank Webpage, https://www.mcmaster.com/90221a416, 2019, 1 page.

Stryker Medical, "Prime Series Stretcher Maintenance Manual", REF 1115, 111504090002 Rev. B.0, Dec. 2018, 472 pages.

English language abstract for CN 108028005 A extracted from espacenet.com database on Apr. 25, 2025, 2 pages.

English language abstract for TWM 465161 U extracted from Google Translate on Apr. 25, 2024, 2 pages.

\* cited by examiner

PATIENT TRANSPORT APPARATUS WITH ELECTRO-MECHANICAL BRAKING SYSTEM

CROSS-REFERENCE TO RELATED APPLICATION

This application is a Continuation of U.S. patent application Ser. No. 17/789,869 filed on Jun. 29, 2022, which is the U.S. National Stage Entry of International Patent Application No. PCT/US2020/066767 filed on Dec. 23, 2020, which claims priority to and all the benefits of U.S. Provisional Patent Application No. 62/954,765 filed on Dec. 30, 2019, the disclosures of each of which are hereby incorporated by reference in their entirety.

BACKGROUND

Patient transport apparatuses, such as hospital beds, stretchers, cots, wheelchairs, and transport chairs facilitate care of patients in a health care setting. Conventional patient transport apparatuses include a support structure having a patient support deck upon which the patient is supported, wheels to allow the patient transport apparatus to move along the floor, and a braking system having brakes to stop movement of the patient transport apparatus.

At least some known braking systems include manual foot pedals mounted to the support structure to engage or disengage the brakes. Electrical braking systems are also known for engaging and disengaging the brakes. Often, the braking system includes a linkage having a plurality of links wherein each of the links is operatively coupled to the brakes such that movement of one link causes movement of the other links and corresponding engagement or disengagement of all the brakes. There can be challenges associated with connecting, protecting, and/or supporting the links, and/or guiding movement of the links during operation. There can also be challenges associated with connecting the linkage to manual or electric actuators, determining a current state of the braking system, and/or ensuring that the brakes are fully engaged or fully disengaged.

A patient transport apparatus with a braking system is desired that addresses one or more of the aforementioned challenges.

SUMMARY

The subject disclosure is directed towards a patient transport apparatus comprising a support structure with a base and a patient support deck. A plurality of wheels are coupled to the support structure, and a plurality of brakes are arranged to brake the wheels. A linkage is operatively coupled to the plurality of brakes and is operable between: a braked state to brake the plurality of wheels, and a released state to release the plurality of wheels. The linkage has a first link that rotates to move the plurality of brakes between the braked state and the released state, and a second link that slides to move the plurality of brakes between the braked state and the released state. A retainer is coupled to the support structure and cooperates with the linkage to limit movement of the linkage. The retainer has a stop to engage the first link to limit movement of the first link, and a guide to receive the second link to limit movement of the second link.

The subject disclosure is also directed towards a patient transport apparatus comprising a support structure with a base and a patient support deck. A plurality of wheels are coupled to the support structure, and a plurality of brakes are arranged to brake the wheels. A linkage is operatively coupled to the plurality of brakes and is operable between: a braked state to brake the plurality of wheels, and a released state to release the plurality of wheels. A position sensor is responsive to operation of the linkage to determine whether the linkage is in the braked state or the released state. A sensor actuator is coupled to the linkage to move with the linkage between the braked state and the released state. The sensor actuator has an actuating head supported by the support structure for movement relative to the position sensor, and an engagement interface carried by the linkage to move with the linkage.

DETAILED DESCRIPTION OF THE EMBODIMENTS

Figure 1:
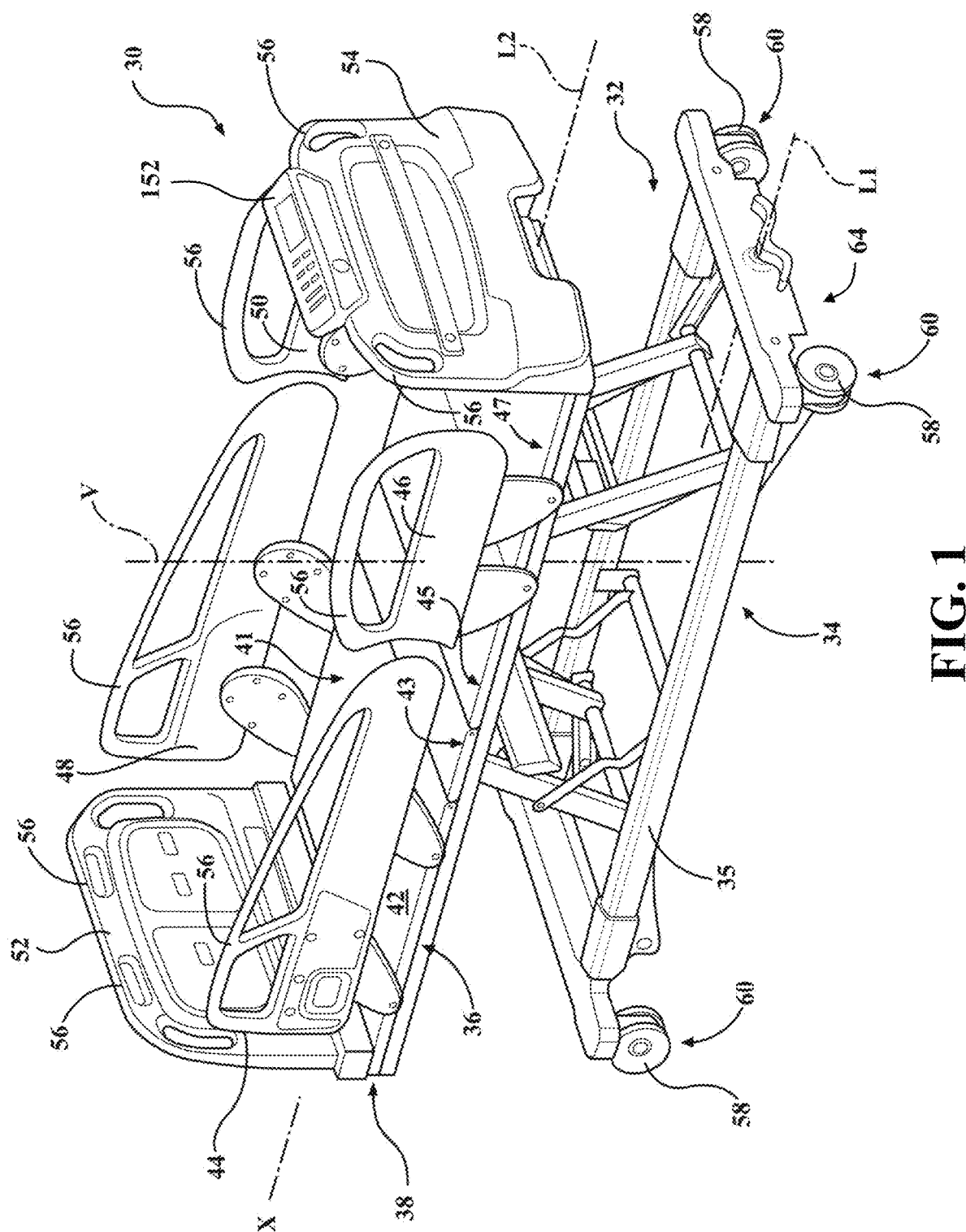
FIG. 1 is perspective view of a patient transport apparatus.

Referring to FIG. 1, a patient transport apparatus 30 is shown for supporting a patient in a health care setting. The patient transport apparatus 30 illustrated in FIG. 1 is a hospital bed. In other embodiments, however, the patient transport apparatus 30 may be a stretcher, cot, wheelchair, transport chair, or similar apparatus utilized in the care of a patient.

A support structure 32 provides support for the patient. The support structure 32 illustrated in FIG. 1 includes a base 34 and a support frame 36. The base 34 includes a base frame 35. The support frame 36 is spaced above the base frame 35 in FIG. 1. The support structure 32 also includes a patient support deck 38 disposed on the support frame 36. The patient support deck 38 includes several sections, some of which are capable of articulating (e.g., pivoting) relative to the support frame 36, such as a back (fowler) section 41, a seat section 43, a leg section 45, and a foot section 47. The patient support deck 38 provides a patient support surface 42 upon which the patient is supported.

A mattress (not shown) is disposed on the patient support deck 38 during use. The mattress includes a secondary patient support surface upon which the patient is supported. The base 34, support frame 36, patient support deck 38, and patient support surfaces 42 each have a head end and a foot end corresponding to designated placement of the patient's head and feet on the patient transport apparatus 30. The base 34 includes a longitudinal axis L1 along its length from the head end to the foot end. The base 34 also includes a vertical axis V arranged crosswise (e.g., perpendicularly) to the longitudinal axis L1 along which the support frame 36 is lifted and lowered relative to the base 34. The construction of the support structure 32 may take on any known or conventional design and is not limited to that specifically set forth above. In addition, the mattress may be omitted in certain embodiments, such that the patient rests directly on the patient support surface 42.

Patient barriers, such as side rails 44, 46, 48, 50 are coupled to the support frame 36 and/or patient support deck 38 and are thereby supported by the base 34. A first side rail 44 is positioned at a right head end. A second side rail 46 is positioned at a right foot end. A third side rail 48 is positioned at a left head end. A fourth side rail 50 is positioned at a left foot end. In the embodiment shown, the head end side rails 44, 48 are mounted to the back section 41 for movement with the back section 41. The foot end side rails 46, 50 are mounted to the support frame 36 for movement with the support frame 36. If the patient transport apparatus 30 is a stretcher or a cot, there may be fewer side rails. The side rails 44, 46, 48, 50 are movable relative to the back section 41/support frame 36 to a raised position in which they block ingress and egress into and out of the patient transport apparatus 30, one or more intermediate positions, and a lowered position in which they are not an obstacle to such ingress and egress. In the embodiment shown, the side rails 44, 46, 48, 50 are connected to the back section 41 and/or the support frame 36 by pivotal support arms to form four bar linkages. Such side rails and the manner in which they may be raised/lowered are shown and described in U.S. Patent Application Pub. No. 2017/0172829, filed on Dec. 15, 2016 and entitled "Powered Side Rail For A Patient Support Apparatus," hereby incorporated by reference in its entirety.

A headboard 52 and a footboard 54 are coupled to the support frame 36. The headboard 52 and footboard 54 may be coupled to any location on the patient transport apparatus 30, such as the support frame 36 or the base 34. In still other embodiments, the patient transport apparatus 30 does not include the headboard 52 and/or the footboard 54.

Caregiver interfaces 56, such as handles, are shown integrated into the headboard 52, footboard 54, and side rails 44, 46, 48, 50 to facilitate movement of the patient transport apparatus 30 over a floor surface. Additional caregiver interfaces 56 may be integrated into other components of the patient transport apparatus 30. The caregiver interfaces 56 are graspable by the caregiver to manipulate the patient transport apparatus 30 for movement, to move the side rails 44, 46, 48, 50, and the like.

Other forms of the caregiver interface 56 are also contemplated. The caregiver interface may include one or more handles coupled to the support frame 36. The caregiver interface may simply be a surface on the patient transport apparatus 30 upon which the caregiver logically applies force to cause movement of the patient transport apparatus 30 in one or more directions, also referred to as a push location. This may include one or more surfaces on the support frame 36 or base 34. This could also include one or more surfaces on or adjacent to the headboard 52, footboard 54, and/or side rails 44, 46, 48, 50. In other embodiments, the caregiver interface may include separate handles for each hand of the caregiver. For example, the caregiver interface may include two handles.

Figure 5A:
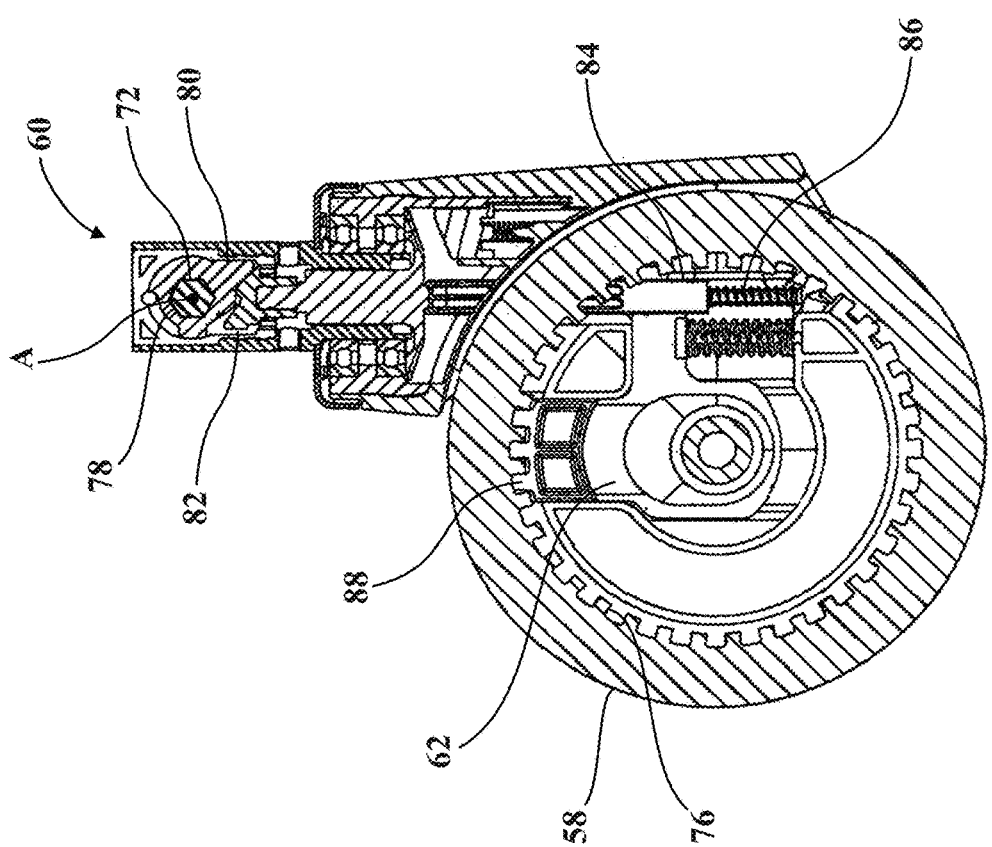
FIG. 5A is a cross-sectional view of a caster assembly that may be used with the electro-mechanical braking system with a brake in a braked state.
Figure 5B:
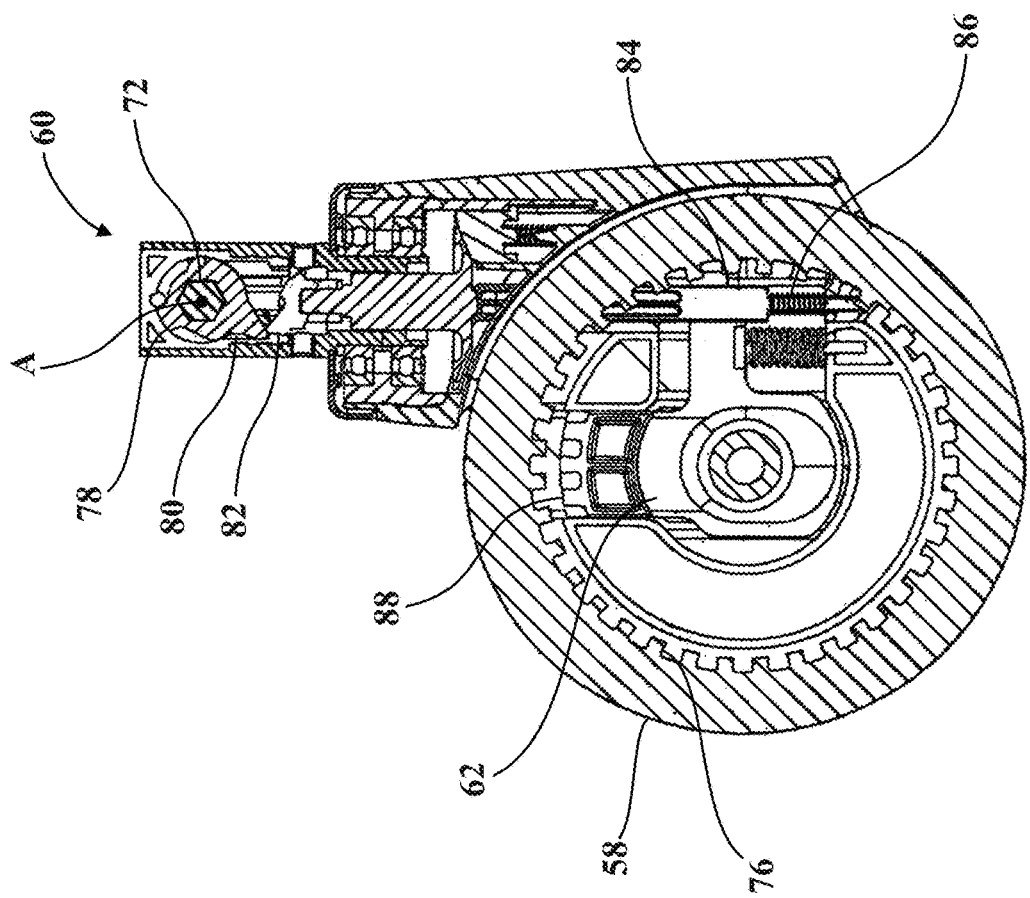
FIG. 5B is a cross-sectional view of a caster assembly that may be used with the electro-mechanical braking system with the brake in a released state.

A mobility arrangement is coupled to the base 34 to facilitate transport over the floor surface. The mobility arrangement includes a plurality of wheels 58. The wheels 58 are arranged in each of four quadrants of the base 34 adjacent to corners of the base 34. In the embodiment shown, the wheels 58 are caster wheels able to rotate and swivel relative to the support structure 32 during transport. Each of the wheels 58 forms part of a caster assembly 60. Each caster assembly 60 is mounted to the base 34 and includes a brake 62 to brake the wheel 58 (one example of which is shown in FIGS. 5A-5B). It should be understood that various configurations of the caster assemblies 60 are contemplated. In addition, in some embodiments, the wheels 58 are not caster wheels and may be non-steerable, steerable, non-powered, powered, or combinations thereof. Additional wheels are also contemplated. For example, the patient transport apparatus 30 may include four non-powered, non-steerable wheels, along with one or more powered wheels. In some cases, the patient transport apparatus 30 may not include any wheels.

In other embodiments, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient transport apparatus 30. A fifth wheel may also be arranged substantially in a center of the base 34.

Figure 2:
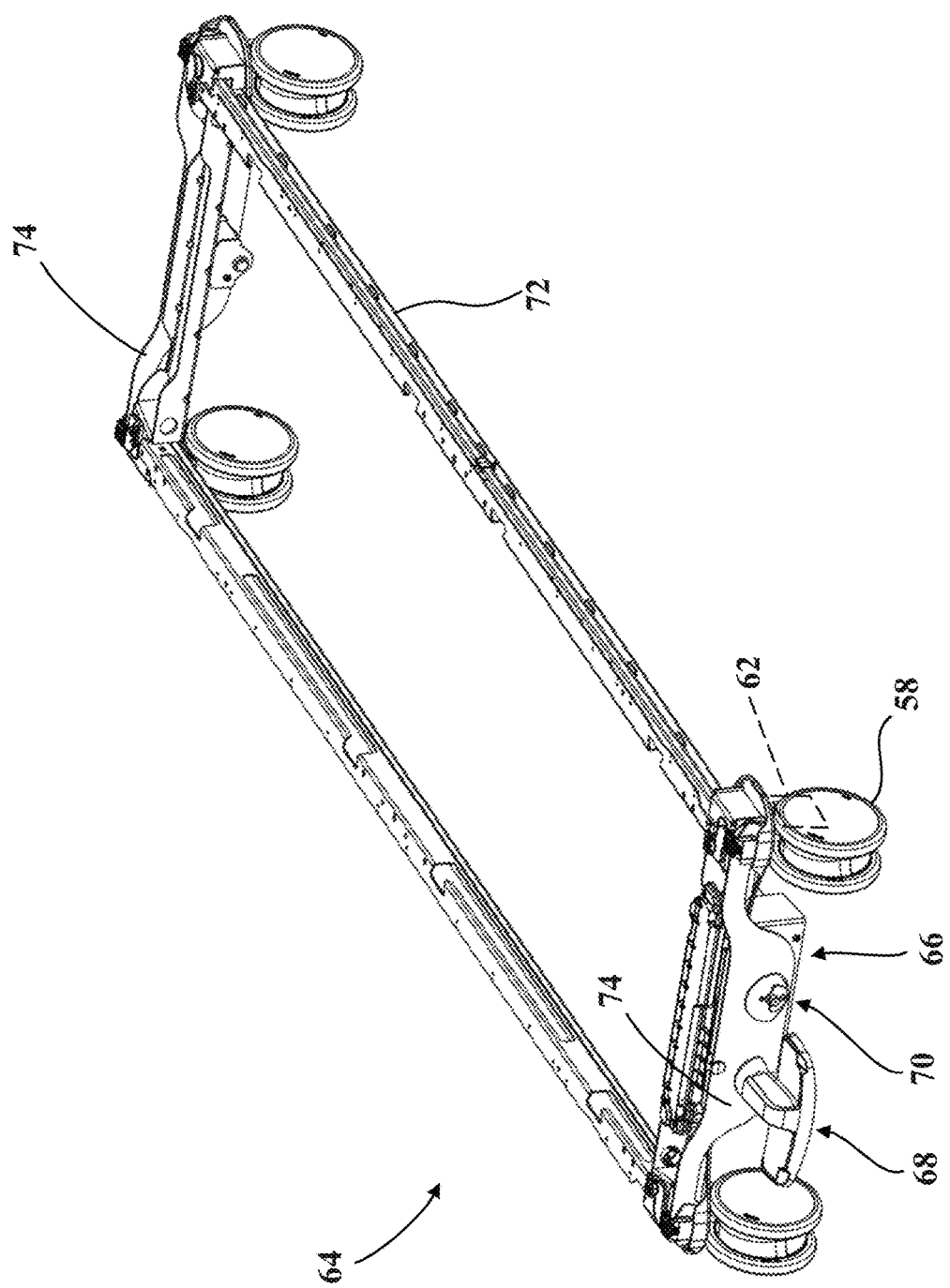
FIG. 2 is a perspective view of a portion of the patient transport apparatus illustrating an electro-mechanical braking system.
Figure 3:
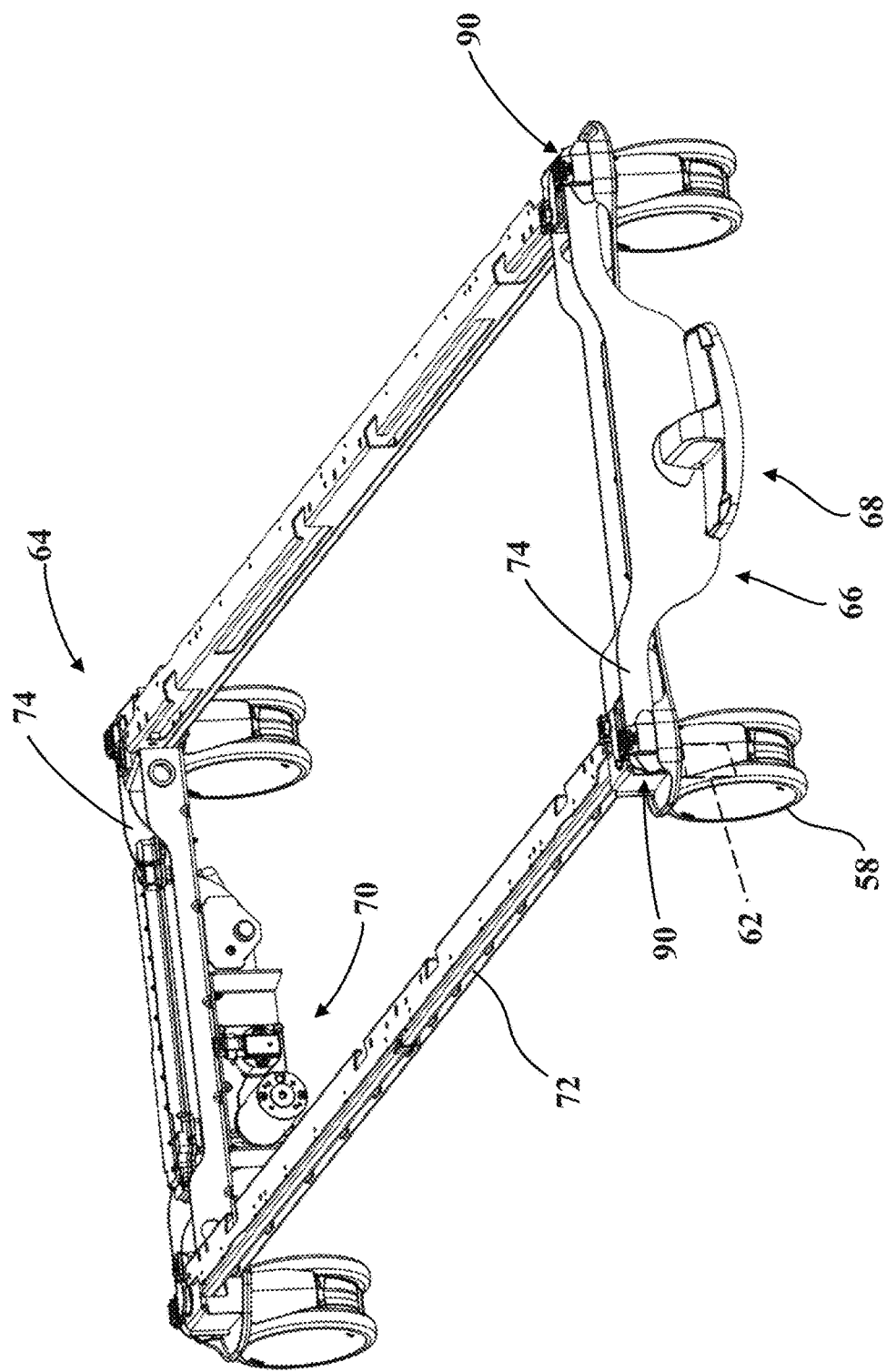
FIG. 3 is another perspective view of the portion of the patient transport apparatus illustrating the electro-mechanical braking system.
Figure 4:
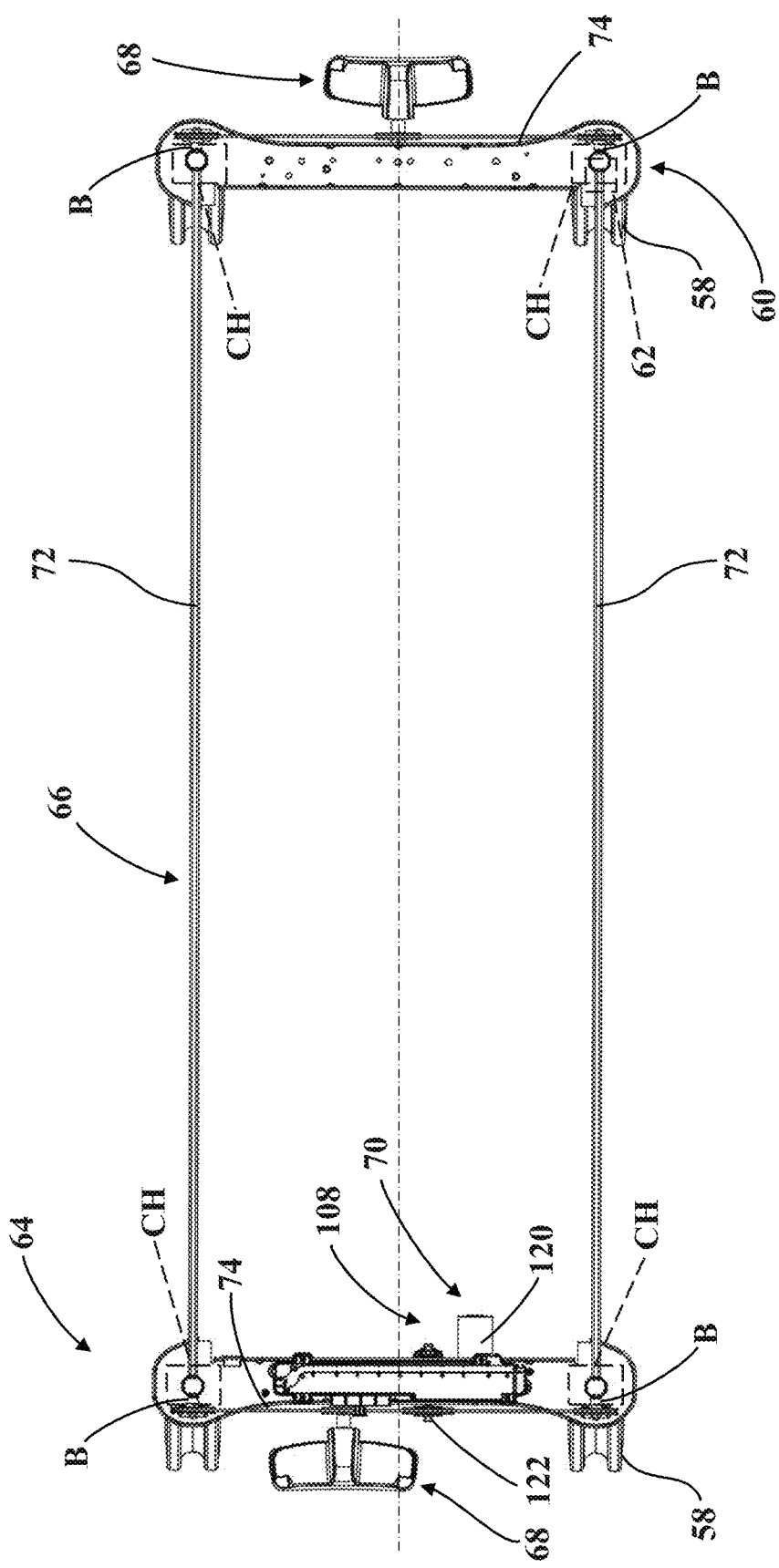
FIG. 4 is a top view of the portion of the patient transport apparatus illustrating the electro-mechanical braking system.

Referring to FIGS. 2-4, the patient transport apparatus 30 includes an electro-mechanical braking system 64 to enable a user, such as a caregiver, to selectively engage or disengage the brakes 62 associated with the wheels 58. The patient transport apparatus 30 is shown in FIGS. 2-4 with the support frame 36 and the patient support deck 38 removed for illustration purposes. It should be appreciated that in the embodiment shown, each of the wheels 58 has an associated brake 62, but in some versions, fewer than all the wheels 58 may have an associated brake 62, e.g., only one, two, or three of the four wheels 58 have an associated brake 62. In some versions, the electro-mechanical braking system 64 may include a plurality of brakes 62 (e.g., two, three, four, etc.) arranged to brake the wheels 58.

The electro-mechanical braking system 64 includes a linkage 66 that is operatively coupled to the brakes 62, a manual actuator 68 that is coupled to the linkage 66, and an electrical braking assembly 70 that is coupled to the linkage 66. The linkage 66 is configured to move in response to actuation via the manual actuator 68 or the electrical braking assembly 70 to operate the brakes 62 as described further below As shown in FIG. 4, the linkage 66 includes a pair of first links 72. In some embodiments, each of the first links 72 includes an elongated shaft having a hexagonal cross-sectional shape. The first links 72 may also be referred to as hex shafts. The first links 72 extend longitudinally, generally parallel to the longitudinal axis L1, from the head end to the foot end of the patient transport apparatus 30. The first links 72 are rotatably supported by the base 34 for rotation about their axes. For example, the first links 72 may be rotatably supported in a caster housing CH or other bracket of the base 34 via bushings B, bearings, or the like (caster housings CH shown in phantom in FIG. 4).

The linkage 66 further includes a pair of second links 74 arranged laterally at each of the head end and foot end. In some embodiments, the second links 74 include racks that are gear-driven as described further below. The second links 74 are supported by the base 34 to slide laterally relative to the base 34. Each of the second links 74 is operatively coupled to both the first links 72 such that movement of either of the second links 74 results in corresponding movement of both the first links 72 and movement of the other of the second links 74. In other words, the first links 72 and the second links 74 are operatively interconnected such that movement of any one of the links 72, 74 causes movement of the other links 72, 74. For instance, movement of one of the second links 74 via the manual actuator 68 or the electrical braking assembly 70 functions to slide that second link 74 thereby rotating both the first links 72 to operate the brakes 62.

In the illustrated embodiment, the linkage 66 is arranged and operable to place the brakes 62 in a braked state (shown in FIG. 5A) in which each brake 62 acts to brake movement of a corresponding wheel 58 and a released state (shown in FIG. 5B) in which each brake 62 is released from braking the wheel 58. The released state may also be referred to as a neutral state. The linkage 66 may also be coupled to one or more steer lock mechanisms (not shown) to place the one or more steer lock mechanisms in a steer locked state in which one or more of the wheels 58 are prevented from swiveling, while other wheels 58 remain able to swivel.

As shown in FIGS. 5A and 5B, in some embodiments, each caster assembly 60 includes a plurality of teeth 76 defined along an interior surface of the wheel 58. An eccentric member 78 is coupled to one of the first links 72 to rotate with the first link 72 about its axis A. The eccentric member 78 (also referred to as a cam) includes an actuating projection 80 that acts on a switching head 82. The switching head 82 is coupled to a switching pin 84 which is moveable in a vertical direction. A compression spring 86 is attached to the switching pin 84 to bias the switching pin 84 in an upward vertical direction toward the eccentric member 78. The brake 62 is coupled to the switching pin 84 and includes a plurality of brake teeth 88 that are arranged to engage the teeth 76 defined along the interior surface of the wheel 58. During operation, as the first link 72 is rotated about its axis A via actuation by the manual actuator 68 or the electrical braking assembly 70, the eccentric member 78 is rotated to move the actuating projection 80 along a profiled surface of the switching head 82 to move the brake 62 between the braked state (FIG. 5A) in which the brake teeth 88 engage the teeth 76 defined along the interior surface of the wheel 58, and the released state (FIG. 5B) in which the brake teeth 88 are spaced a distance from the teeth 76 defined along the interior surface of the wheel 58.

In the version of the patient transport apparatus 30 that is shown, each of the pair of first links 72 extends between two caster assemblies 60 to operate the brakes 62 for two caster assemblies 60. In other words, rotation of one of the first links 72 operates two brakes for two caster assemblies 60 and rotation of the other of the first links 72 operates two brakes for two other caster assemblies 60 so that all four caster assemblies 60 are braked substantially simultaneously (substantially simultaneous owing to any slop or tolerances in the linkage 66).

Other suitable caster assemblies having brakes that operate via a hex shaft or other suitable actuation member could also be used. For example, the caster assemblies and associated brakes may be like those disclosed in U.S. Pat. No. 8,789,662, entitled, "Wheeled Carriage With Brake Lock System," which is hereby incorporated herein by reference. Moreover, the brakes may also be external brakes or other forms of brakes that operate via a linkage, but may not be part of a caster assembly.

Figure 6A:
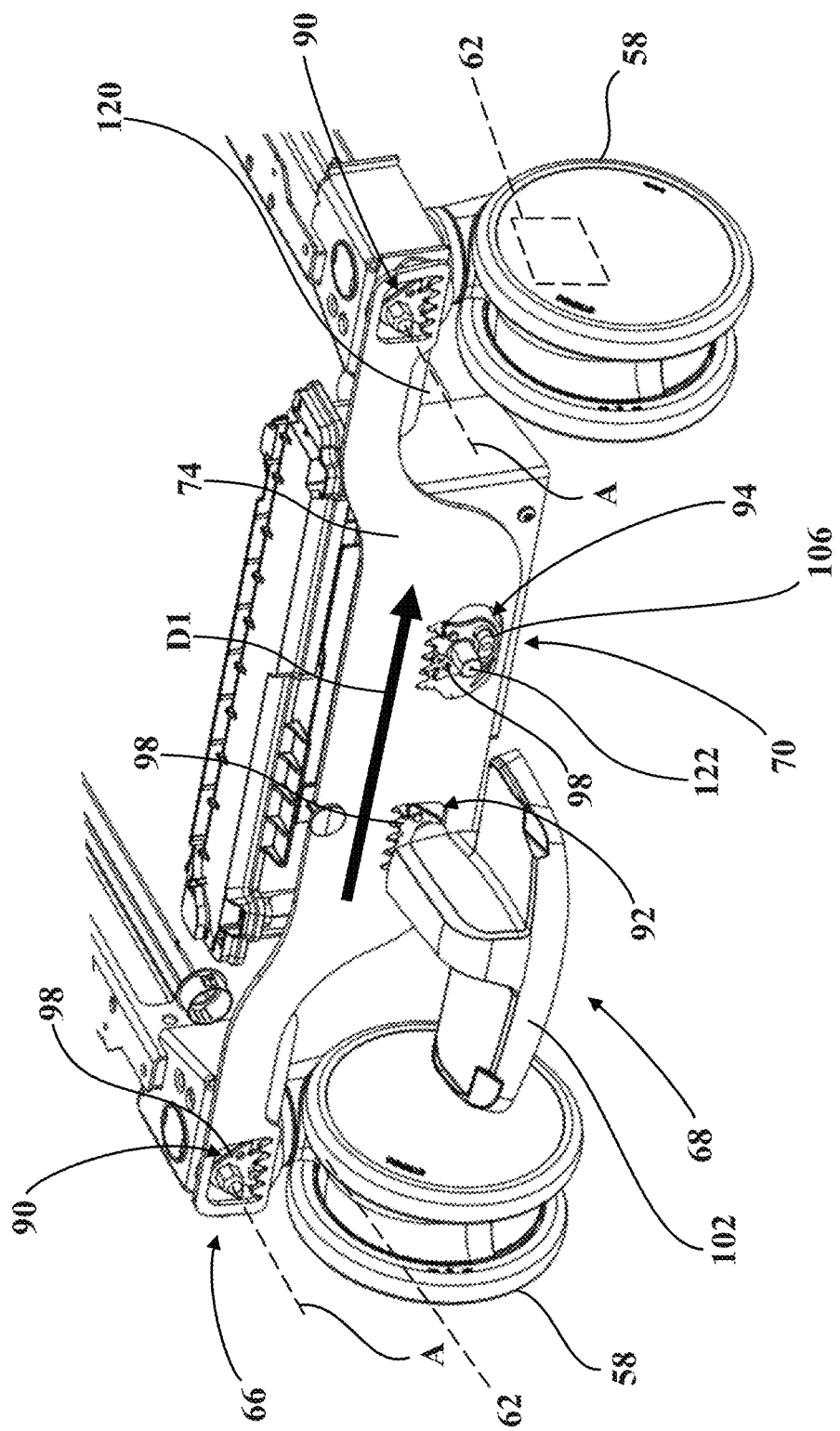
FIGS. 6A-6C are close-up perspective views of a portion of the electro-mechanical braking system in the released, braked, and steer locked states, respectively.
Figure 6B:
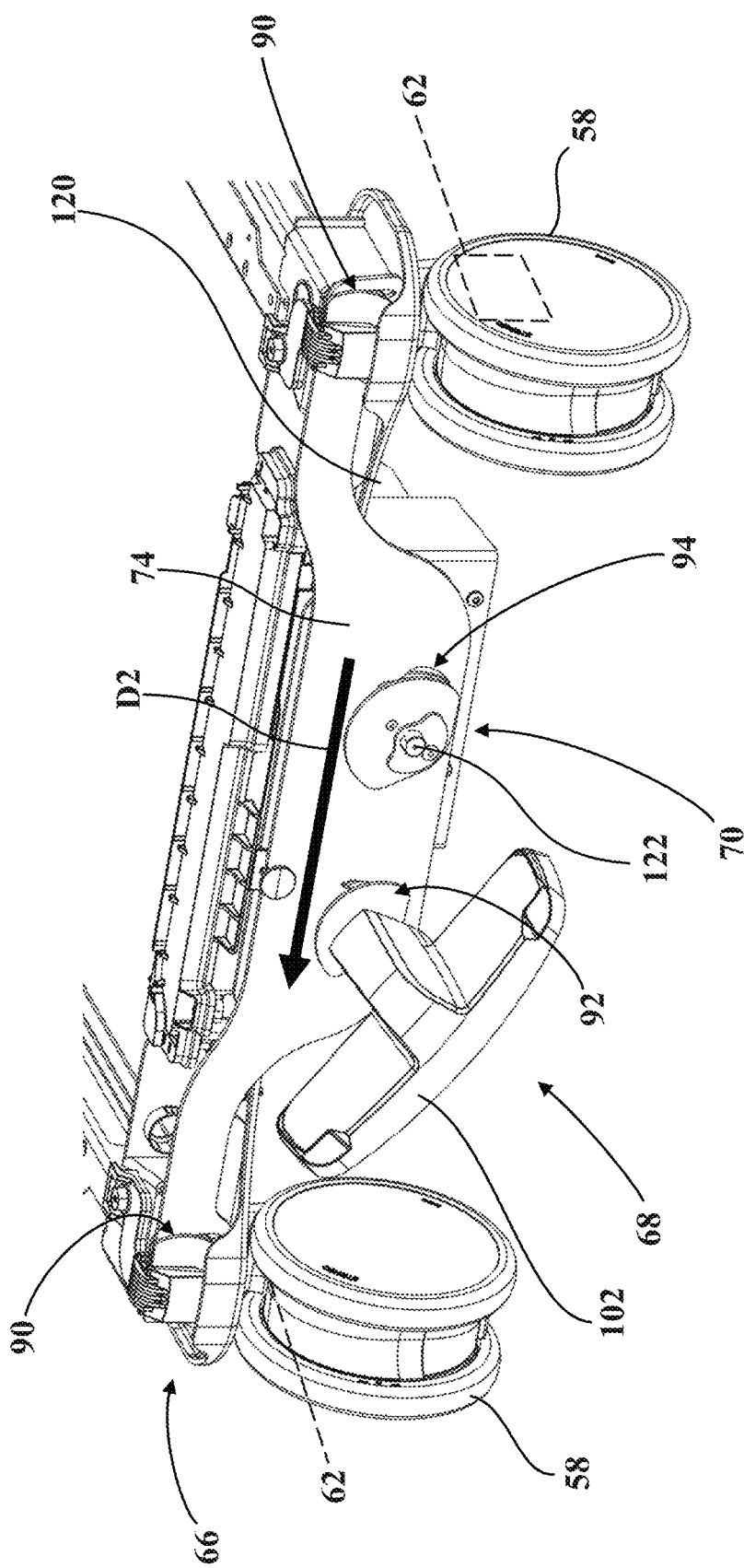
Figure 6C:
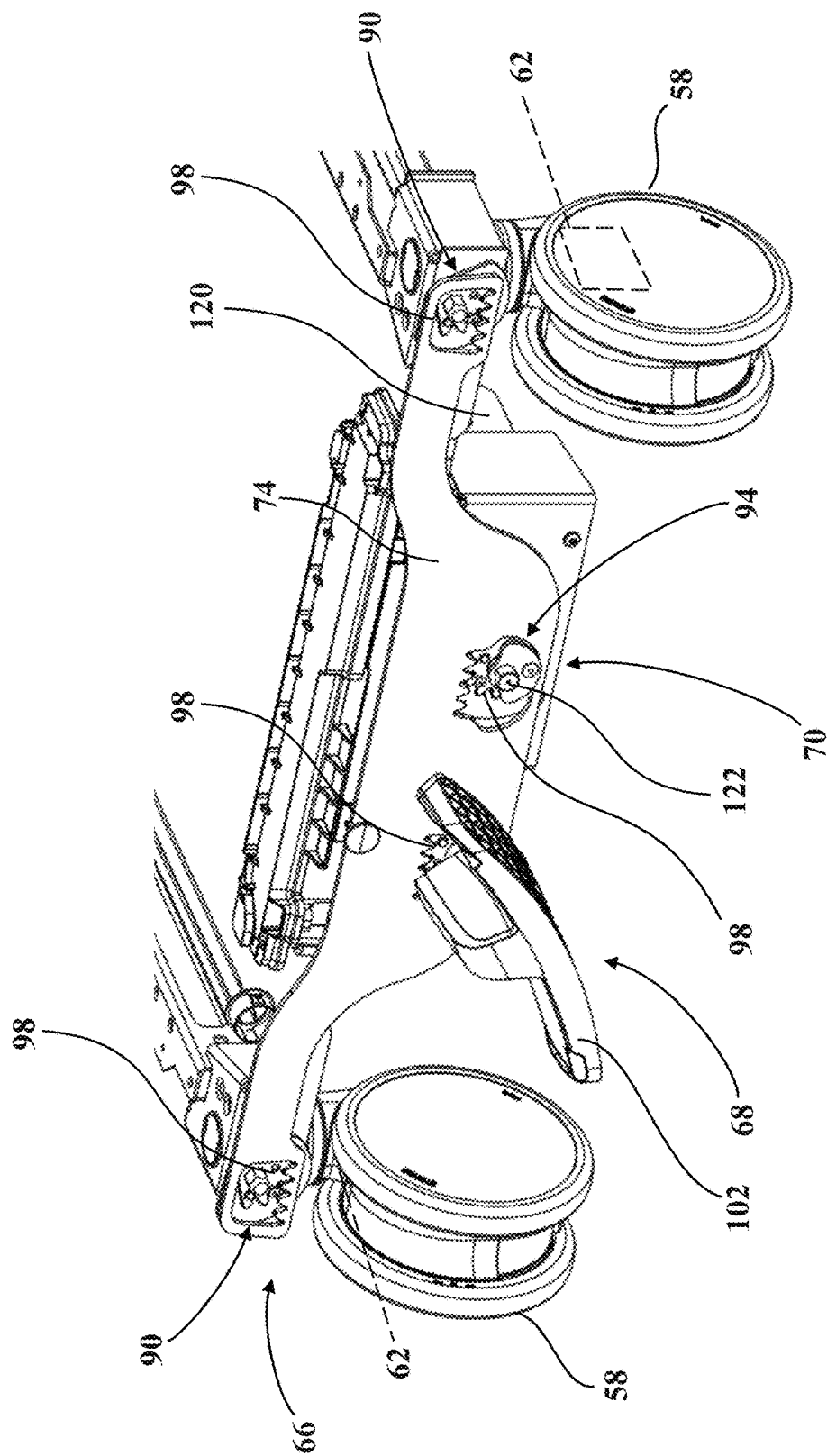

Referring to FIGS. 6A-6C, the manual actuator 68 (one at each of the head end and foot end) is coupled to the linkage 66 to move the linkage 66 manually to place the brakes 62 in the braked state, or in the released state, or to place the steer lock mechanism in the steer locked state. The manual actuators 68 may be operated by a caregiver to place the linkage 66 and the brakes 62 in the released state to release the wheels 58 (FIG. 6A), or may be operated by the caregiver to place the linkage 66 and the brakes 62 in the braked state to brake the wheels 58 (FIG. 6B), or may be operated by the caregiver to place the linkage in the steer locked state (FIG. 6C). The manual actuator 68 shown in FIGS. 6A-6C causes the second link 74 to move in a first direction D1 to place the brake 62 in the braked state (see transition from FIG. 6A to FIG. 6B) and causes the second link 74 to move in a second direction D2 (see transition from FIG. 6B to FIG. 6A) to place the brake 62 in the released state from the braked state. Note that various components of the electro-mechanical braking system 64 are removed in FIGS. 6A-6C for purposes of illustrating motion of the linkage 66 between the various states.

The electrical braking assembly 70 is also coupled to the linkage 66 and includes a motor 120 and drive shaft 122 configured to move the linkage 66 to place the electromechanical braking system 64 in the braked state, the released state, and/or the steer locked state. The electrical braking assembly 70 has a driving member 106 described further below that is configured to be moved by the drive shaft 122 to cause the second link 74 to move in the first direction D1 to place the brake 62 in the braked state and to cause the second link 74 to move in the second direction D2 to place the brake 62 in the released state from the braked state. Details of operation of the manual actuator 68, the electrical braking assembly 70, and corresponding movements are described in U.S. Patent Application Pub. No. 2019/0192364, entitled "Patient Transport Apparatus With Electro-Mechanical Braking System," which is hereby incorporated herein by reference.

Referring to FIGS. 7-10, in the illustrated embodiment, the linkage 66 includes a plurality of coupling links 90 (two at both head and foot ends, although only one end is shown). In the version shown, there are four coupling links 90 (two at each end). Each of the coupling links 90 couples one of the first links 72 to one of the second links 74. The linkage 66 further includes a pair of manual drive links 92 (one at each of the head and foot ends). Each of the manual drive links 92 is configured to be directly driven by one of the manual actuators 68 (one at each of the head and foot ends) to cause movement of the linkage 66. The linkage 66 also includes an electric drive link 94. The electric drive link 94 is configured to be driven by the driving member 106 of the electrical braking assembly 70 to cause movement of the linkage 66. Only one electric drive link 94 is present in the version shown, but other electric drive links 94 could be employed.

Figure 7:
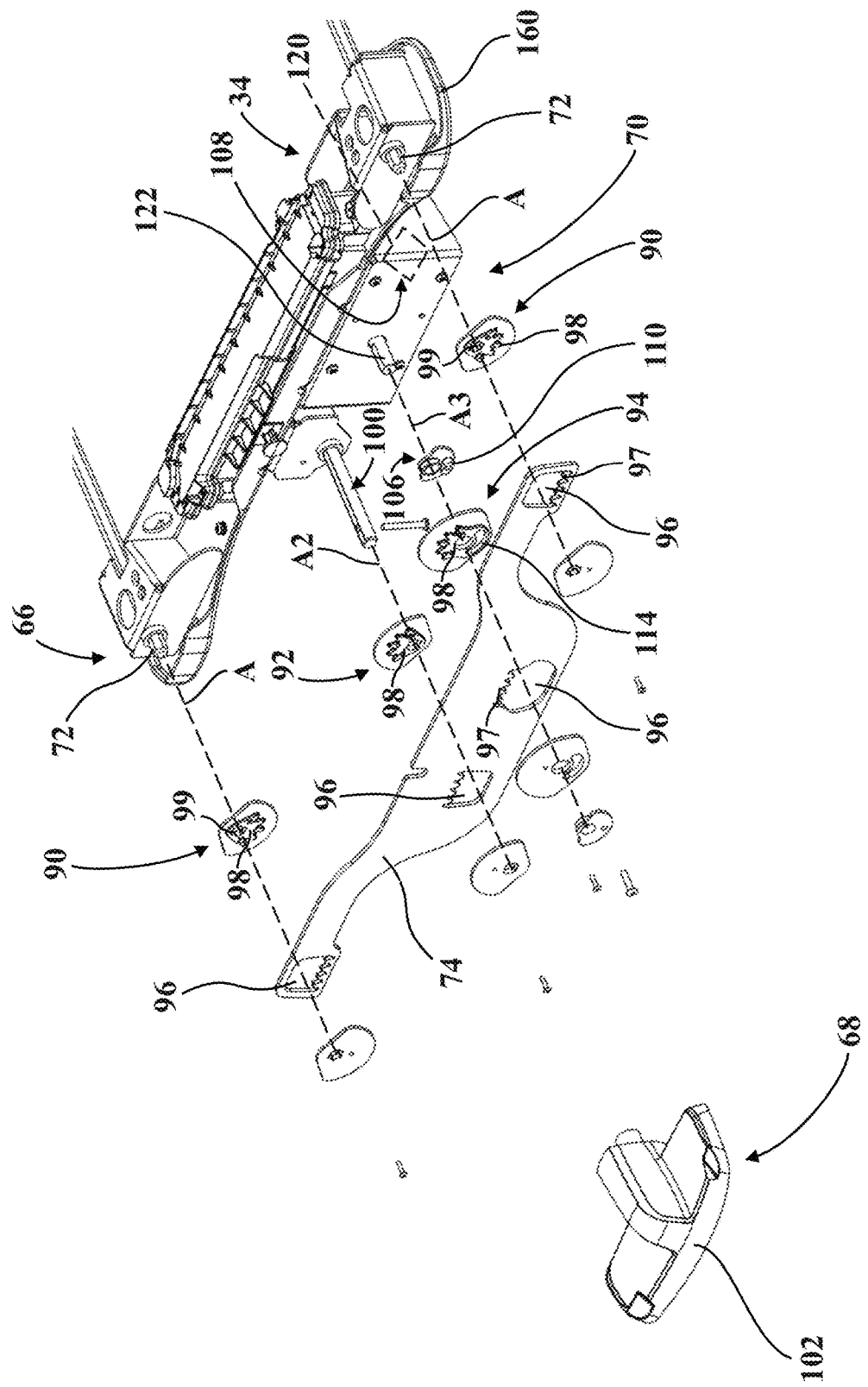
FIG. 7 is a partially exploded, perspective view of portions of a linkage of the electro-mechanical braking system.

As best shown in FIG. 7, each of the second links 74 defines a plurality of engagement slots 96 extending through the second link 74 (only one of the second links 74 shown in FIG. 7). Each engagement slot 96 is sized and shaped to receive a corresponding coupling link 90 or drive link 92, 94 therein. In the illustrated embodiment, each of the coupling links 90 and each of the drive links 92, 94 includes a sector gear 98. The sector gears 98 may be separate components or integral components of the coupling links 90 and the drive links 92, 94. The engagement slots 96 may include a plurality of engagement teeth 97 that are configured to contact corresponding teeth of the sector gear 98 during rotation of the sector gears 98 in their engagement slots 96. The sector gears 98 are positioned within the engagement slots 96 such that movement of the sector gears 98 is linked to movement of the second link 74. More specifically, the rotational axes of the sector gears 98 are fixed relative to the base 34 such that rotation of the sector gears 98 causes sliding movement of the second link 74, i.e., in a rack and pinion fashion, between the various states.

In some embodiments, the sector gears 98 rotate less than 90 degrees when moving between the various states, and in some cases, less than 60 degrees, or less than 45 degrees, such that the total rotation of the sector gears 98 in the engagement slots 96 is less than 180 degrees, less than 120 degrees, or less than 90 degrees. Additionally, the teeth of the two outer sector gears 98 (i.e., of the coupling links 90) face generally downwardly during operation between the various states while the teeth of two inner sector gears (i.e., of the drive links 92, 94) face generally upwardly during operation between the various states to at least partially constrain vertical motion of the second link 74.

As shown in FIG. 7, each of the coupling links 90 and each of the drive links 92, 94 are formed by two identical halves (including two halves of the sector gears 98) that are sandwiched together through the engagement slots 96 (only one half is numbered). The two halves may have suitable alignment features described further below to mate the halves together. The halves may be fixed to each other by any suitable method, such as welding, adhesive, fasteners, brazing, snap-fit connections, or the like.

The sector gears 98 of the coupling links 90 are mounted to the first links 72, for example, by mating hexagonal shaped through openings 99 of the sector gears 98 onto the hex shafts. The sector gears 98 of the coupling links 90 could be mounted to the first links 72 in other ways such that these sector gears 98 rotate with the first links 72 during operation of the linkage 66. The sector gear 98 of the manual drive link 92 is mounted to a manual actuation shaft 100 of the manual actuator 68. The manual actuation shaft 100 is rotatably supported by the base 34. This sector gear 98 is mounted to the manual actuation shaft 100, e.g., via a mating double-D connection, to rotate with the manual actuation shaft 100 about its axis A2 when the manual actuator 68 is being actuated by a caregiver (or when the manual actuation shaft 100 is being passively rotated, such as during actuation by the electrical braking assembly 70). The sector gear 98 of the electric drive link 94 is responsive to operation of the electrical braking assembly 70 to rotate about an axis A3 of the drive shaft 122 as described further below. During operation of the linkage 66, the sectors gears 98 rotate about their corresponding axes A, A2, A3, the second links 74 slide, and the first links 72 rotate about their axes A to move the plurality of brakes 62 between the various states (see again FIGS. 5A and 5B).

Referring briefly back to FIGS. 6A and 6B, during operation of the electro-mechanical braking system 64, as the second link 74 slides in the first direction D1 (e.g., via actuation by the manual actuator 68 and the manual drive link 92, or via actuation by the electrical braking assembly 70 and the electric drive link 94), the second link 74 causes a movement of the coupling links 90 (via the sector gear 98 and teeth 97 engagement) which rotates the first links 72 in a counter-clockwise direction about their axes A to move the brakes 62 to the braked state (FIG. 6B). As the second link 74 slides in the second direction D2, the second link 74 moves the coupling links 90 to rotate the first links 72 about their axes A in a clockwise direction to move the corresponding brakes 62 to the released state (FIG. 6A). Further movement of the first links 72 in the clockwise direction, in some embodiments, moves the steer lock mechanism to the steer locked state.

Of course, while movement of only one of the second links 74 is described above, such movement also causes movement of the other second link 74 as the first and second links 72, 74 are interconnected to be substantially simultaneously operated. More specifically, the other second link 74 also slides by virtue of the coupling links 90 present at the opposite end of the patient transport apparatus 30. These coupling links 90 couple the first links 72 to the other second link 74 (see FIG. 3). The first links 72 and the other second link 74 are coupled to these coupling links 90 in the same manner described above for the coupling links 90 shown in FIGS. 7-10. In some versions, there may be only one second link 74 and only one manual actuator 68, e.g., the other manual actuator 68 and the other second link 74 may be absent.

Figure 8:
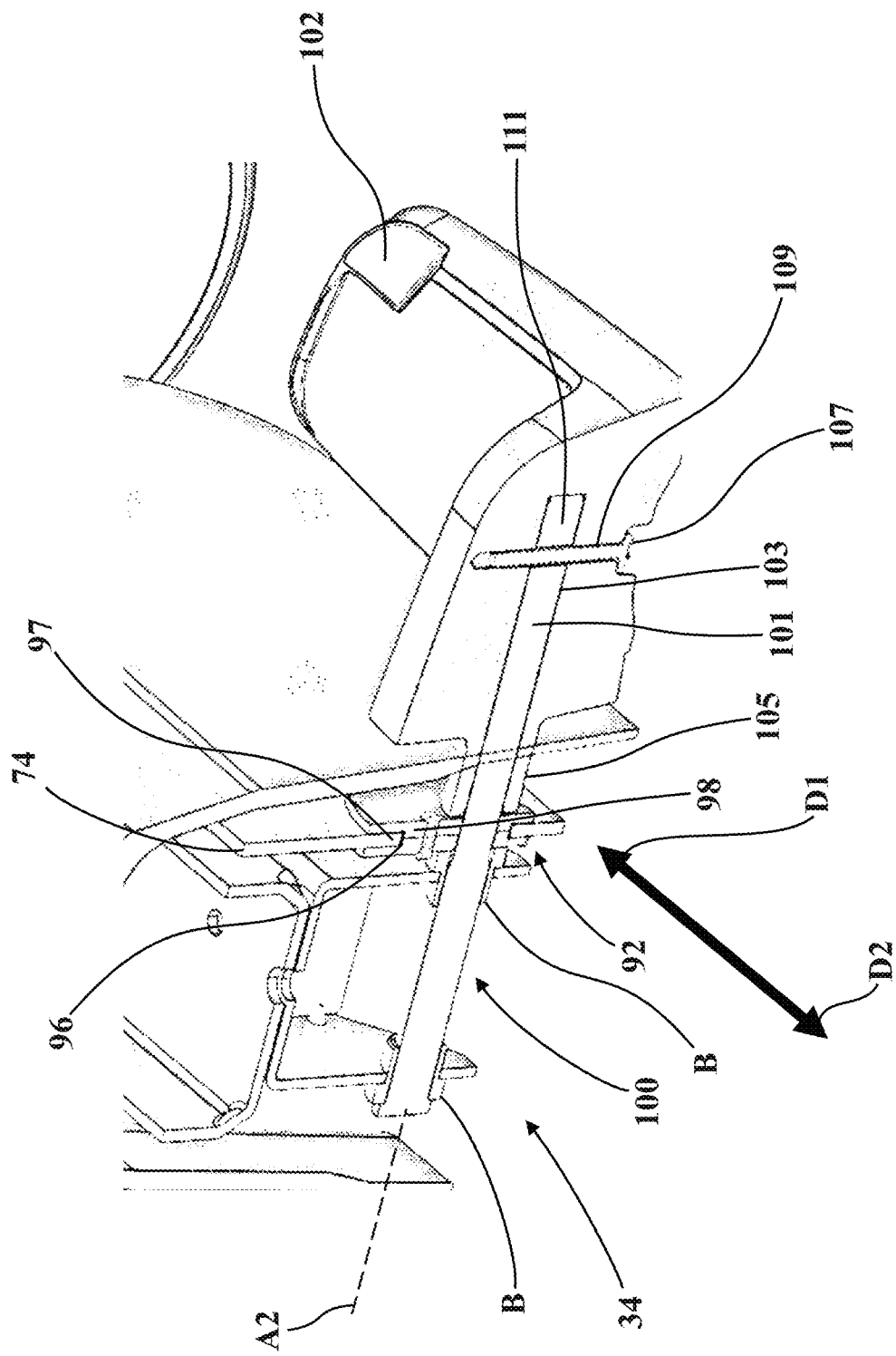
FIG. 8 is a cross-sectional, perspective view of a manual actuator of the electro-mechanical braking system.
Figure 9A:
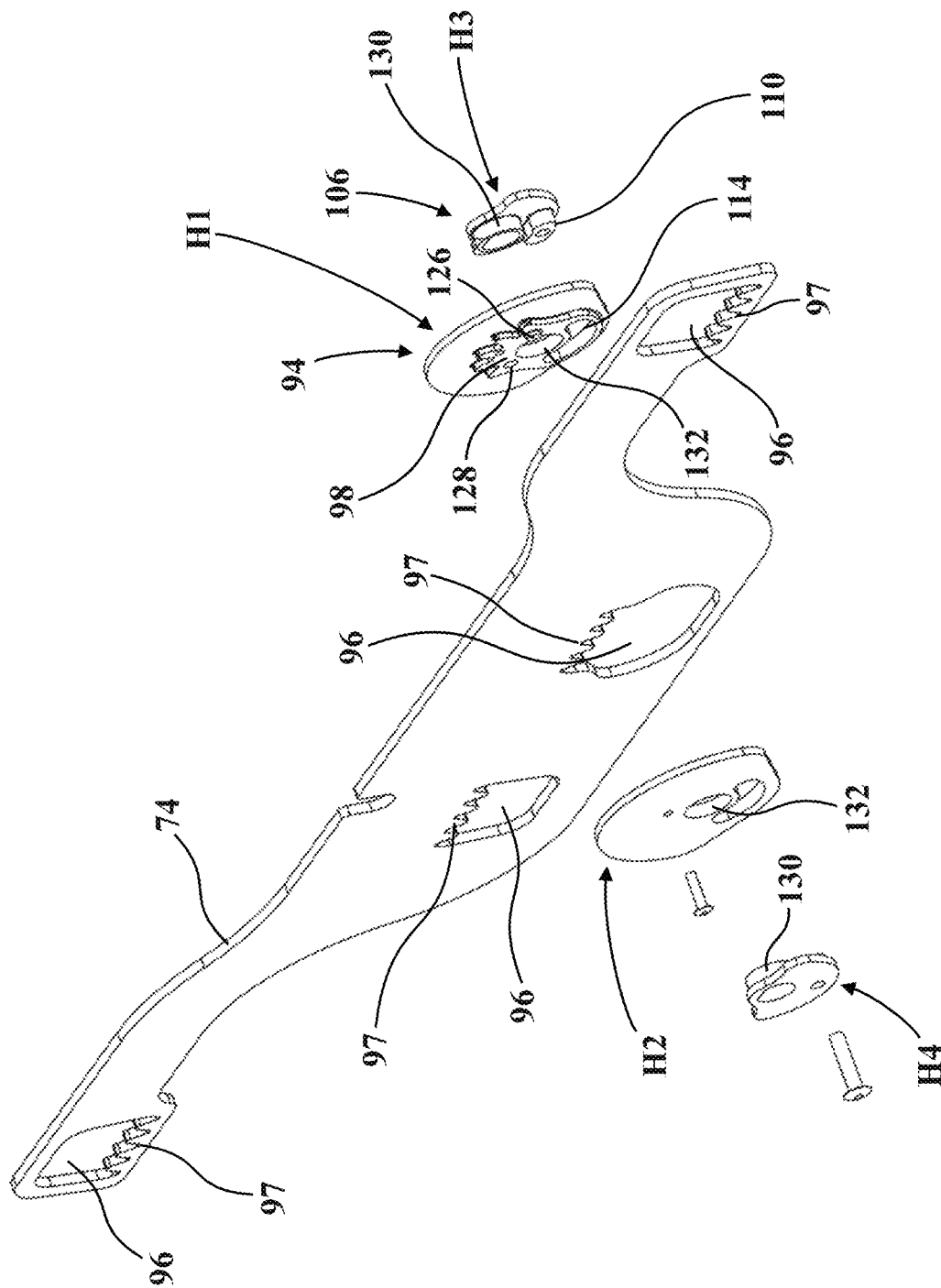
FIG. 9A is an exploded, perspective view of an electric drive link and driving member.
Figure 9B:
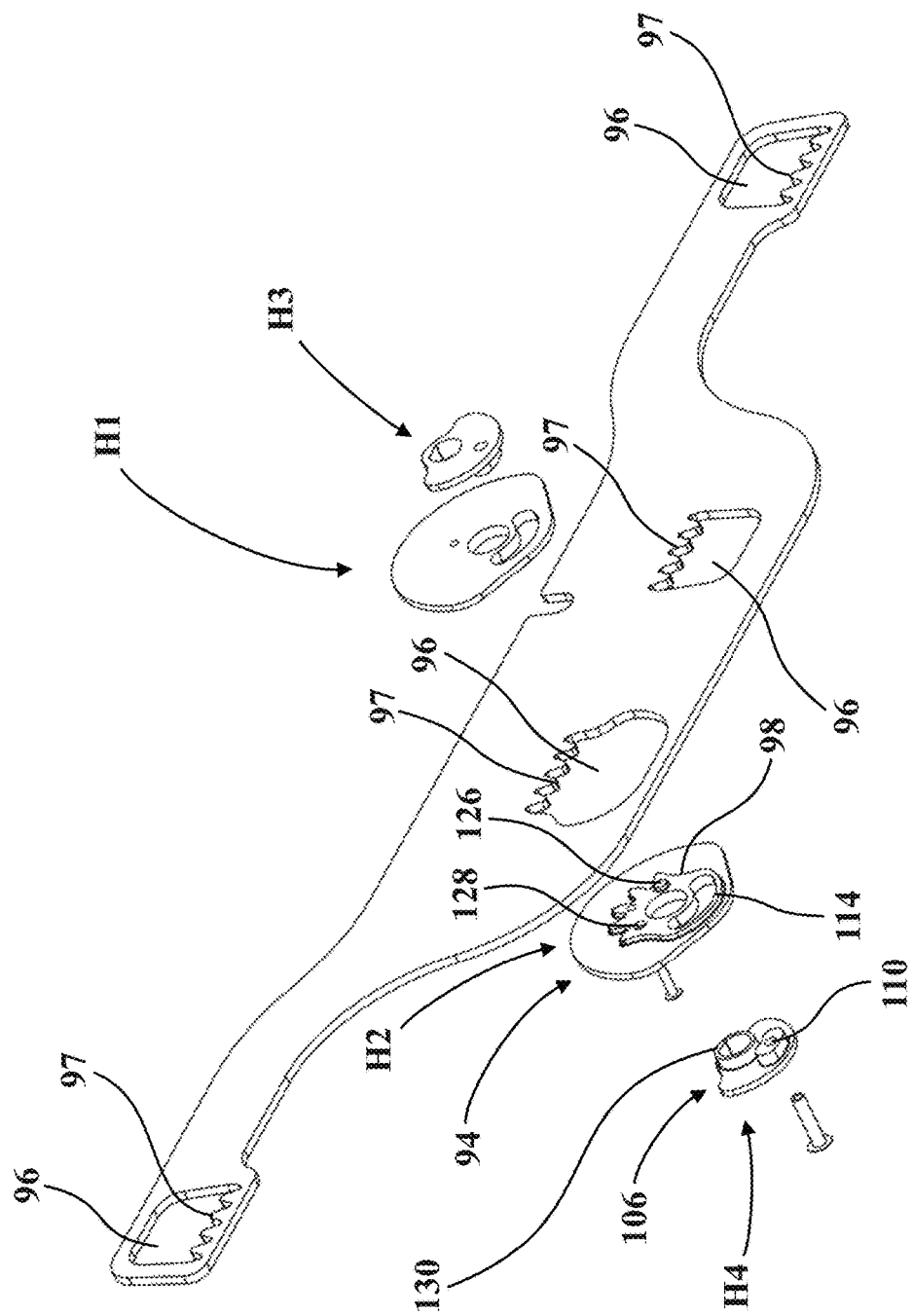
FIG. 9B is another exploded, perspective view of the electric drive link and the driving member.
Figure 10:
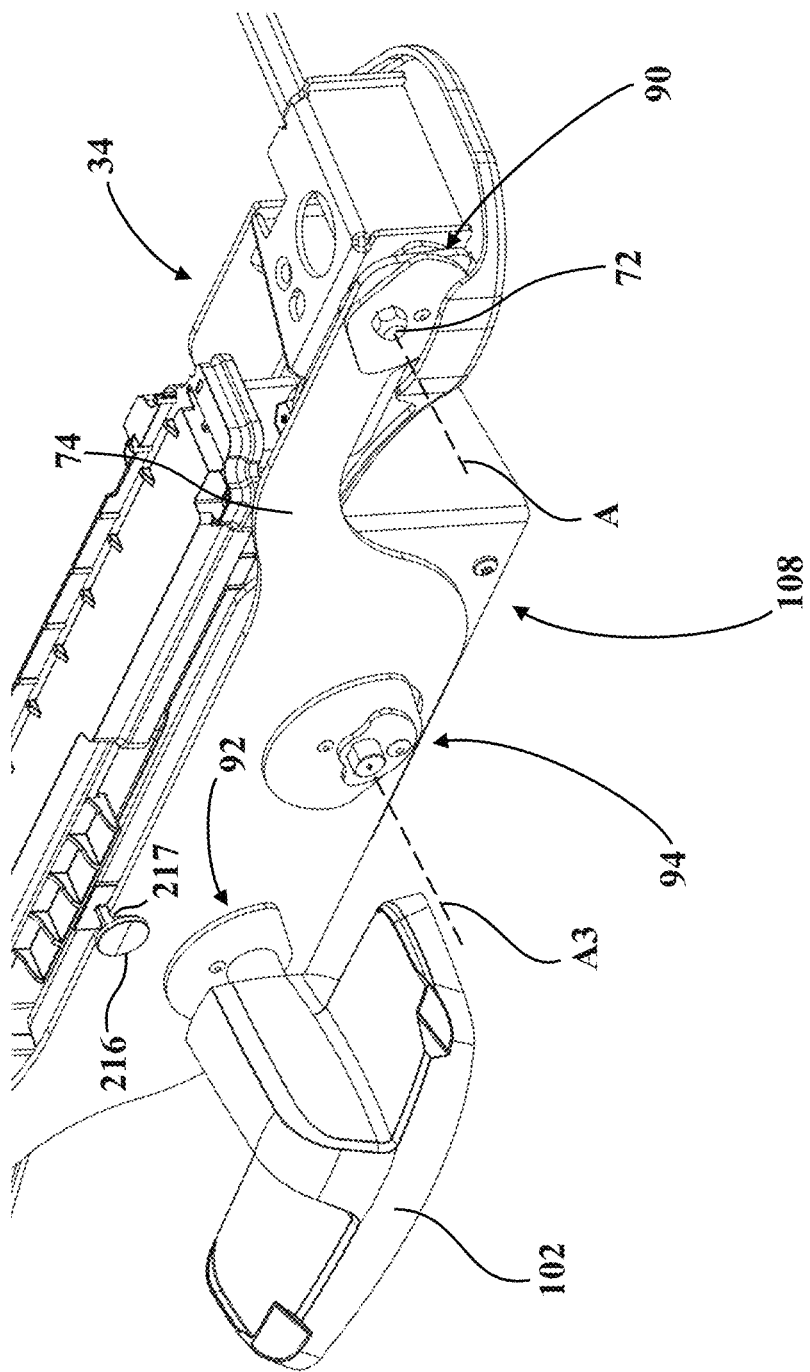
FIG. 10 is a perspective view of the electric drive link and the driving member.

Referring to FIGS. 7 and 8, the manual drive link 92 is coupled to the manual actuator 68 to enable the second link 74 to be moved in the first direction D1 and the second direction D2 manually. In the illustrated embodiment, the manual actuator 68 includes the manual actuation shaft 100 and a brake pedal 102 that is coupled to the manual actuation shaft 100. The manual actuation shaft 100 is coupled to the brake pedal 102 such that a rotation of the brake pedal 102 causes a rotation of the manual actuation shaft 100 and corresponding rotation of the manual drive link 92, which causes the second link 74 to slide in the first direction D1 or the second direction D2. For example, the sector gear 98 of the manual drive link 92 is configured to contact the engagement teeth 97 of the corresponding engagement slot 96 such that a rotation of the manual drive link 92 causes sliding of the second link 74. During operation, a caregiver may operate the brake pedal 102 to rotate the manual actuation shaft 100 and the manual drive link 92 in a clockwise direction to move the second link 74 in the first direction D1 to cause the brakes 62 to move to the braked state. The caregiver may operate the brake pedal 102 to rotate the manual actuation shaft 100 and the manual drive link 92 in a counter-clockwise direction to move the second link 74 in the second direction D2 to cause the brakes 62 to move to the released state. Further movement in the second direction D2, in some embodiments, causes the steer lock mechanism to move to the steer locked state.

Referring specifically to FIG. 8, in the version shown, the manual actuation shaft 100 is supported for rotation in the base 34 about axis A2 (e.g., in a housing or bracket of the base 34 as shown in FIG. 8) by suitable bushings B or bearings. A double-D portion 101 of the manual actuation shaft 100 passes through the manual drive link 92 and is suitably mated thereto (e.g., via a mating double-D opening in the manual drive link 92) for like rotation. The double-D portion 101 has a double-D cross-sectional shape or other suitable rotation-limiting shape that mates with a similarly-shaped through opening in the manual drive link 92. The brake pedal 102 also defines a double-D shaped bore 103 (or other suitable shape) to receive the double-D portion 101 of the manual actuation shaft 100 such that rotation of the brake pedal 102 results in rotation of the manual actuation shaft 100 and like rotation of the manual drive link 92. The brake pedal 102 has a boss 105 that passes through an opening in cladding fixed to the base 34 that shields the manual drive link 92. A fastener 107 (e.g., screw, bolt, etc.) is inserted into another bore 109 of the brake pedal 102 that is transverse to the bore 103. The fastener 107 passes through a transverse through hole 111 in the double-D portion 101 of the manual actuation shaft 100 to axially secure the brake pedal 102 onto the manual actuation shaft 100. The other end of the manual actuation shaft 100 is enlarged to axially hold the manual actuation shaft 100 to the base 34 while allowing the manual actuation shaft 100 to rotate relative to the base 34.

In some versions, the brake pedal 102 is formed by injection molding, and the bore 103 may be formed using a hydraulic slide such that the bore 103 has 0 degrees of draft to allow for a tight fit with the double-D portion 101 of the manual actuation shaft 100 and enable a load applied by a caregiver to travel through the brake pedal 102. The fastener 107 may be a removable fastener that is a plastic thread former that threads into plastic of the brake pedal 102 on both sides of the double-D portion 101 to provide a secure retention of the brake pedal 102 to prevent the brake pedal 102 from sliding off the double-D portion 101. Also, if the double-D portion 101 fails, the fastener 107 will act as the primary load bearing component. A size #10 fastener, or other suitable fastener, may be used.

Referring to FIGS. 7-11, the electrical braking assembly 70 includes the driving member 106, the motor 120 (best shown in FIG. 4), and the drive shaft 122. The motor 120 and drive shaft 122 form part of an actuator assembly 108. The actuator assembly 108 is coupled to the driving member 106 to provide torque to move the second link 74 in the first and second directions D1, D2. The driving member 106 has a driving protrusion 110. The electric drive link 94 includes a positioning slot 114 that is sized and shaped to receive the driving protrusion 110 therein. The positioning slot 114 provides an arcuate travel path for the driving protrusion 110 and is sized so that the driving protrusion 110 is movable along the travel path. The driving protrusion 110 is sized and shaped to contact ends of the travel path of the positioning slot 114. Once either end of the travel path is contacted, then further rotation of the driving protrusion 110 causes a rotation of the electric drive link 94 about its axis A3 and corresponding movement of the second link 74. When the electric drive link 94 rotates about axis A3 via the driving protrusion 110, the sector gear 98 of the electric drive link 94 rotates in its engagement slot 96 to drive the second link 74 as previously described.

The driving member 106 is configured to be moved by the motor 120 and drive shaft 122 to a first position, a second position, and a home position (and in some cases a third position if steer lock is employed). The electrical braking assembly 70 powers the driving member 106 to the first position to cause the second link 74 to move in the first direction D1 to place the brake 62 in the braked state and to the second position to cause the second link 74 to move in the second direction D2 to place the brake 62 in the released state from the braked state. The electrical braking assembly 70 operates to move the driving member 106 to the home position (between the first and second positions) to allow the second link 74 to move freely (without backdriving the motor 120) and enable the brakes 62 to be manually actuated with either of the manual actuators 68. Movements between the first, second, and home positions are described in detail in U.S. Patent Application Pub. No. 2019/0192364, entitled "Patient Transport Apparatus With Electro-Mechanical Braking System," which is hereby incorporated herein by reference.

As best shown in FIGS. 9A-11, the electric drive link 94 may be formed of identical halves H1, H2 that are sandwiched together through the corresponding engagement slot 96 in the second link 74. The two halves H1, H2 of the electric drive link 94 may have suitable alignment features to align the two halves for mating (e.g., see studs 126 and pockets 128). Similarly, the driving member 106 may be formed of identical halves H3, H4 that are sandwiched together through the corresponding engagement slot 96. In this case, there are two halves to the driving protrusion 110 that meet within two halves of the positioning slot 114. Each of the two halves H3, H4 of the driving member 106 also have a cylindrical boss 130 sized and shaped to pass through corresponding openings 132 in the two halves H1, H2 of the drive link 94.

Figure 11:
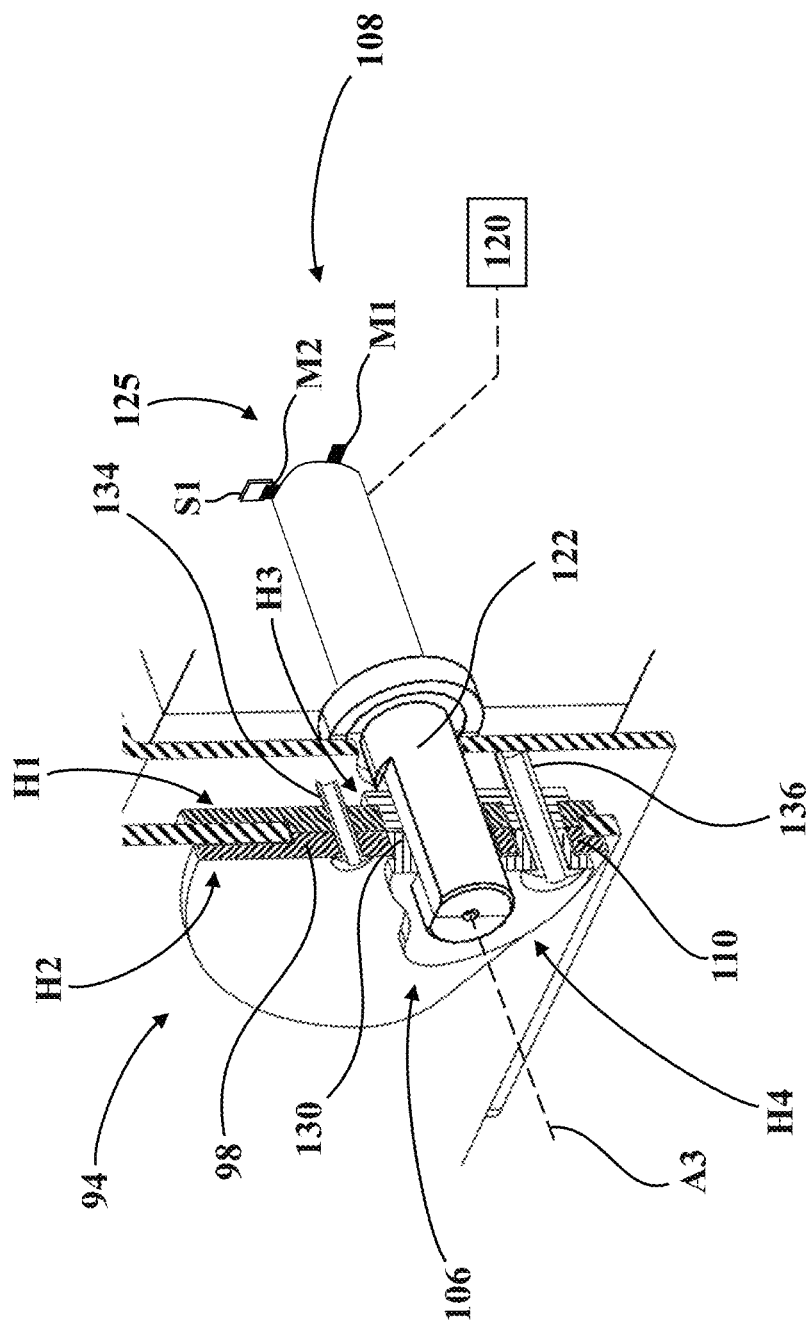
FIG. 11 is a cross-sectional, perspective view of the electric drive link and the driving member.

As shown in FIG. 11, a first rivet 134, or other suitable fastener, secures the two halves H1, H2 of the drive link 94 together. A second rivet 136, or other suitable fastener, secures the two halves H3, H4 of the driving member 106 together and captures the two halves H1, H2 between the two halves H3, H4. The second rivet 136 also passes through the slot 114 in the two halves H1, H2. This facilitates rotation of the driving member 106 relative to the drive link 94 during operation. Providing two separate rivets 134, 136 through the sector gear 98 of the drive link 94 helps to prevent the two halves of the sector gear 98 from flaring apart.

The actuator assembly 108 may include linear actuators, rotary actuators, or other types of actuators. The actuator assembly 108 be electrically operated, electro-hydraulic, hydraulic, pneumatic, and the like. In the illustrated embodiment, the actuator assembly 108 includes the motor 120 (e.g., an electric motor) and the drive shaft 122 that is rotatably coupled to the motor 120, either directly or through a gear train. The driving member 106 is coupled to the drive shaft 122 such that a rotation of the drive shaft 122 rotates the driving protrusion 110, e.g., the driving protrusion 110 is mounted to the drive shaft 122 to rotate with the drive shaft 122. The motor 120 rotates the driving protrusion 110 through the various positions as defined and described in U.S. Patent Application Pub. No. 2019/0192364, entitled "Patient Transport Apparatus With Electro-Mechanical Braking System," which is hereby incorporated herein by reference. The linkage 66 is coupled to the brakes 62 such that a rotation of the electric drive link 94 causes the linkage 66 to operate the brakes 62 to place the brakes 62 in the braked state, or the released state, or to place the steer lock mechanism in the steer locked state.

Figure 11A:
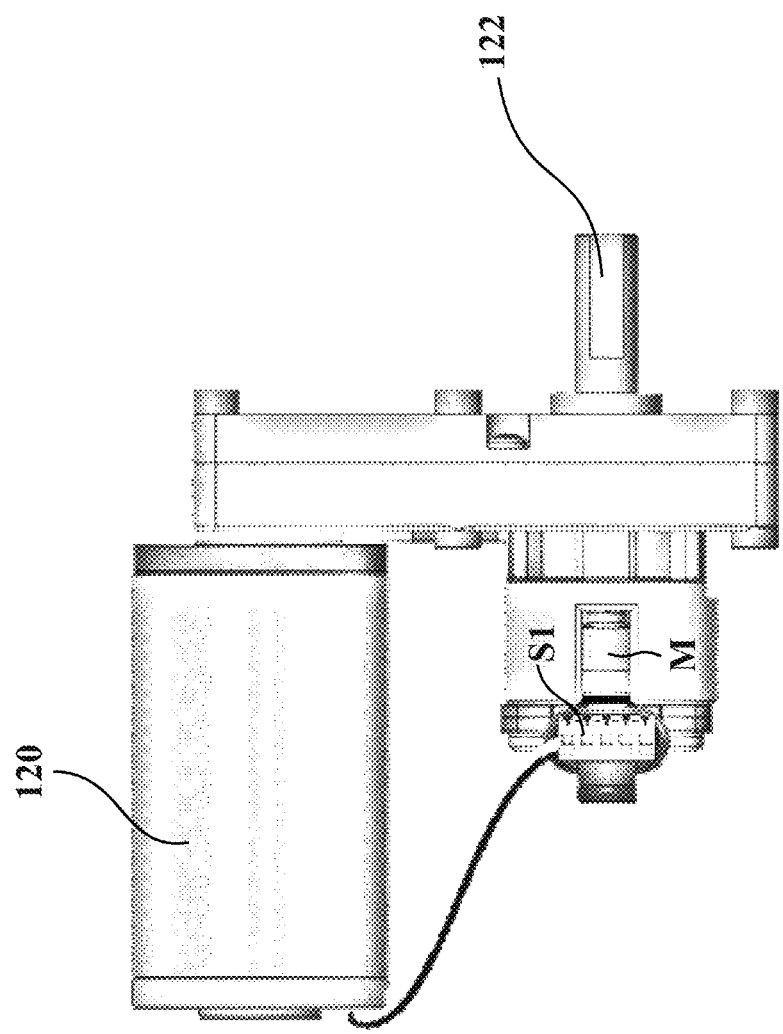
FIG. 11A is a top view of a motor and drive shaft arrangement illustrating a sensor and magnet.

Still referring to FIG. 11, in the illustrated embodiment, the electrical braking assembly 70 includes a sensor assembly 125 that is configured to sense a position of the driving member 106. In one version, the sensor assembly 125 includes a pair of magnets M1, M2 fixed to the drive shaft 122 (which is either directly driven by the motor 120 or through a gear train). The sensor assembly 125 also includes a sensor S1, such as a hall-effect sensor. The magnets M1, M2 are generally positioned at a 90-degree offset (rotational angle) about the drive shaft 122. The magnets M1, M2 are fixed to the drive shaft 122 such that a rotation of the drive shaft 122 rotates the magnets M1, M2 relative to the sensor S1. The sensor S1 is fixed relative to the base 34 (e.g., in a sensor housing fixed to the base 34) to sense the movement of the magnets M1, M2 in a contactless fashion. The sensor S1 and a single magnet M3 may also be arranged as shown in FIG. 11A. Other arrangements are also contemplated. A controller 202 is coupled to the sensor S1 to determine the position of the drive shaft 122 by virtue of the controller 202 receiving a varying voltage signal from the sensor S1. For example, the sensor S1 is arranged to generate a specific voltage or voltage range when the driving member 106 is at the home position, and the controller 202 can thereby store this range for purposes of later driving the drive shaft 122 to reach the home position. The controller 202 can thus monitor the output from the sensor S1 to determine the position of the driving member 106.

The controller 202 is coupled to the motor 120 to control operation of the motor 120 based on input from the sensor S1 so that the motor 120 is able to rotate the drive shaft 122 and move the driving member 106 as needed to place the brakes 62 in the braked state, released state, or to place the steer lock mechanism in the steer locked state. Other sensor types are also contemplated, such as optical encoders, rotary hall-effect sensors, linear hall-effect sensors, proximity sensors, toggle switches, limit switches, or the like. For example, an absolute position encoder may be used to sense a rotational position of the drive shaft 122.

Figure 12A:
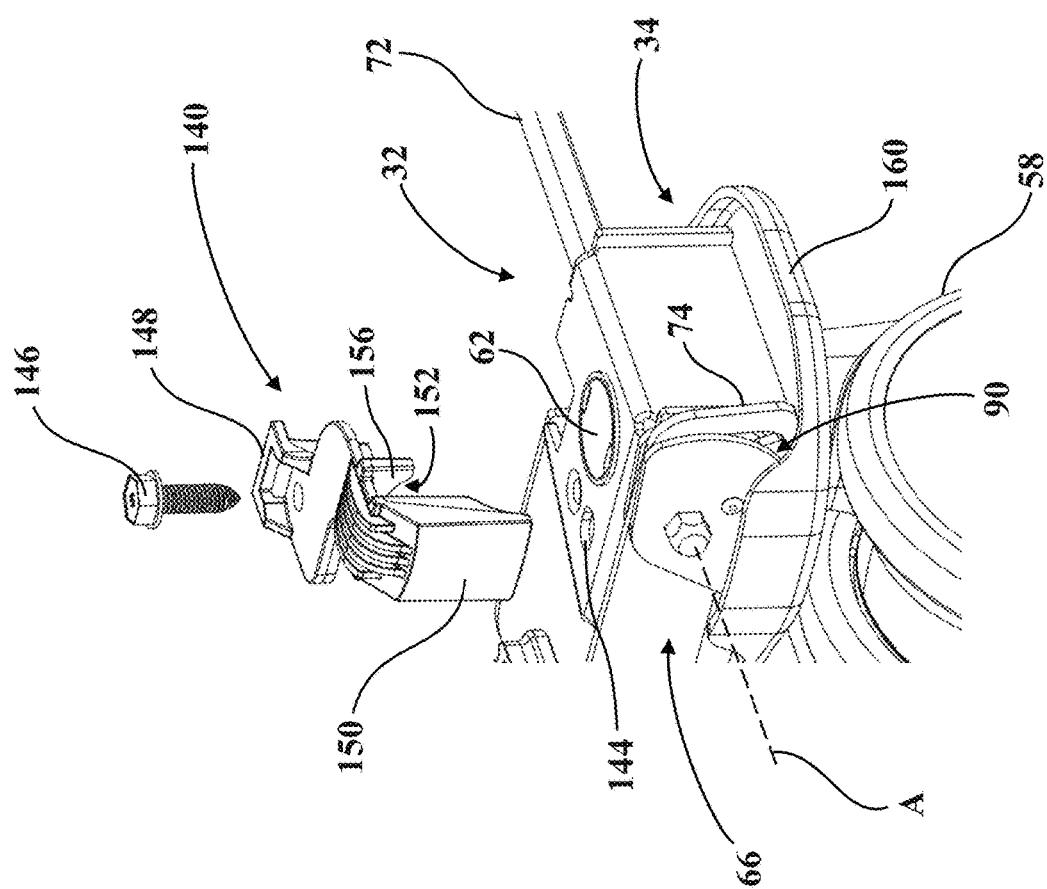
FIG. 12A is a partially exploded, perspective view illustrating a retainer for the linkage.
Figure 12B:
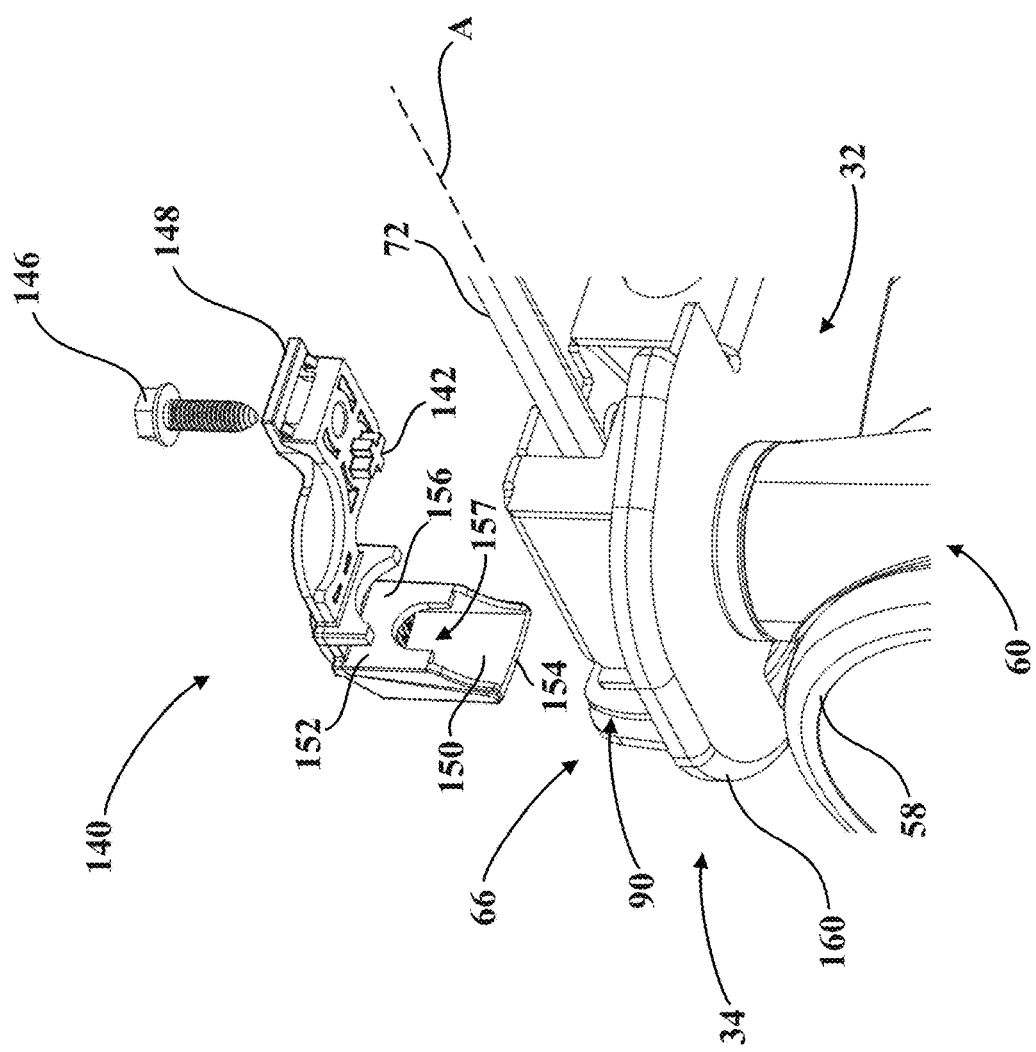
FIG. 12B is another partially exploded, perspective view illustrating the retainer for the linkage.
Figure 13:
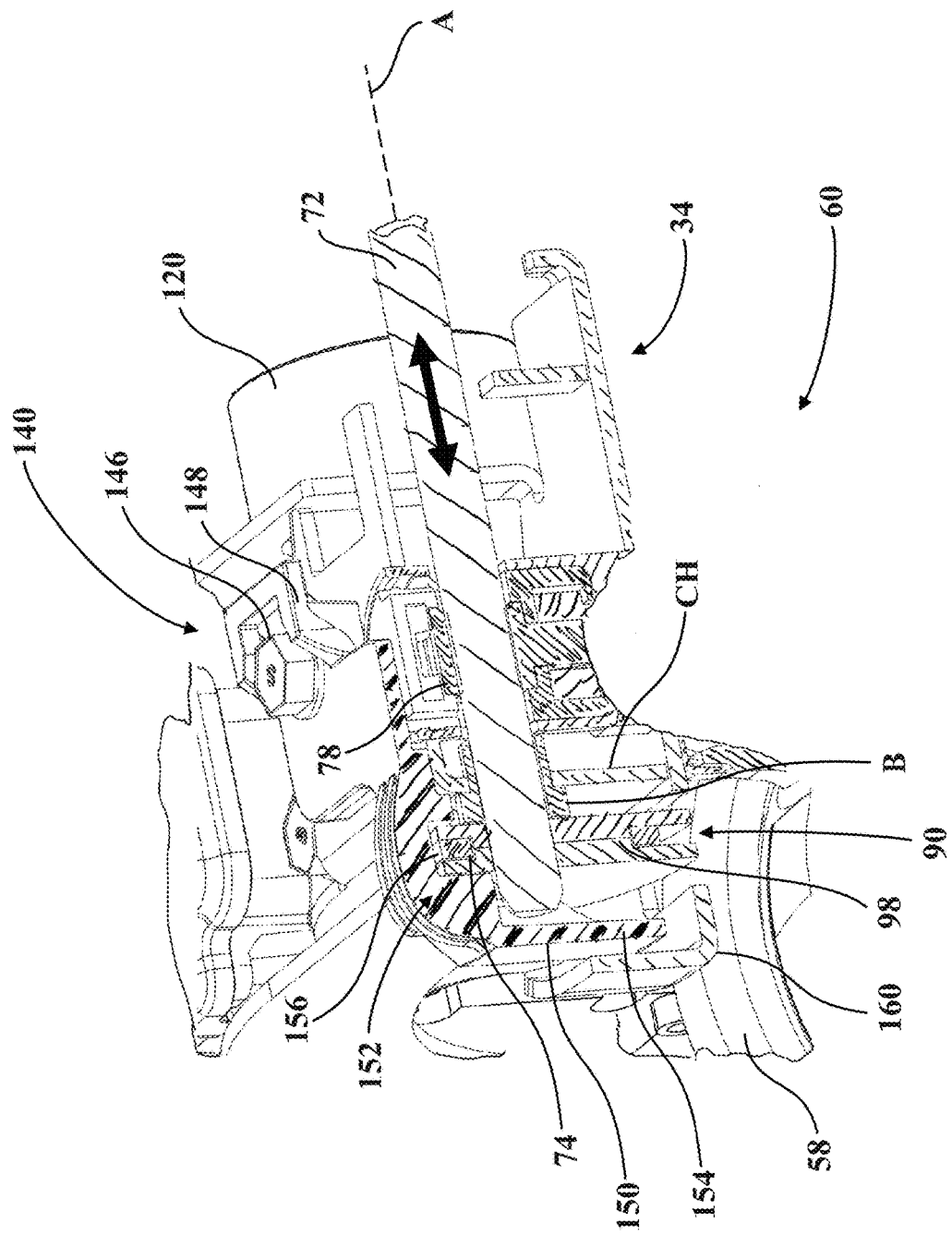
FIG. 13 is a cross-sectional, perspective view of the retainer cooperating with the linkage.

Referring to FIGS. 12A, 12B, and 13, retainers 140 are coupled to the support structure 32. The retainers 140 cooperate with the linkage 66 to limit and/or guide movement of the linkage 66. For instance, the retainers 140 limit longitudinal movement of the first links 72 and guide the sliding movement of the second links 74. Four retainers 140 are present in the embodiment shown, but there may be more or fewer retainers in other embodiments. Only one of the retainers 140 will be described in detail.

As best shown in FIGS. 12A and 12B, each retainer 140 includes a locating post 142. The base 34 includes an opening 144 to receive the locating post 142 to orient the retainer 140 on the base 34 and relative to the linkage 66. A fastener 146 secures each retainer 140 to the base 34 at a location spaced from the locating post 142. The retainer 140 also includes a line manager or shield 148 under which an electrical cable or other form of conduit, cable, line, etc. can be placed for guiding/managing such lines.

As best shown in FIG. 13, each retainer 140 includes a stop 150 to engage one end of the first link 72 to limit movement of the first link 72. Each retainer 140 also includes a guide 152 to receive the second link 74 to limit and guide movement of the second link 74. The stop 150 includes a wall 154 arranged to limit longitudinal movement of the first link 72 by providing an abutment for the first link 72. The guide 152 defines a notch 156 to receive the second link 74 and allow sliding movement of the second link 74 in the notch 156 relative to the retainer 140. The sector gear 98 of the coupling link 90 operatively couples the first link 72 to the second link 74, and the notch 156 is shaped and arranged to receive the coupling link 90 and allow movement of the sector gear 98 within the notch 156 during operation of the linkage 66.

In the embodiment shown, each retainer 140 includes a monolithic structure fixed to the base 34. In some versions, the stop 150 and guide 152 are integrally formed as one-piece of plastic material, and the retainer 140 may be formed by injection molding. The retainer 140 may be formed of other materials. The guide 152 is shaped with a top wall and side walls that form the notch 156 to straddle the second link 74 while still allowing for rotation of the sector gear 98. The retainer 140 also contains a pocket 157 (see FIG. 12B) with a profile to receive the first link 72. In some versions, the first links 72 are free to longitudinally slide in the caster housings CH of the base 34 (see FIG. 13) whereby the stops 150 at each end limit such sliding and prevent the first links 72 from falling out of the sector gears 98 of the coupling links 90. Each retainer 140 is configured to go into full compression with the base 34 in the event of an impact. The base 34 may include a bumper 160 at each of the head end and foot end. The bumpers 160 are located to shield the retainers 140 from impact. The bumpers 160 may be formed of sheet metal or other suitable materials.

Figure 14:
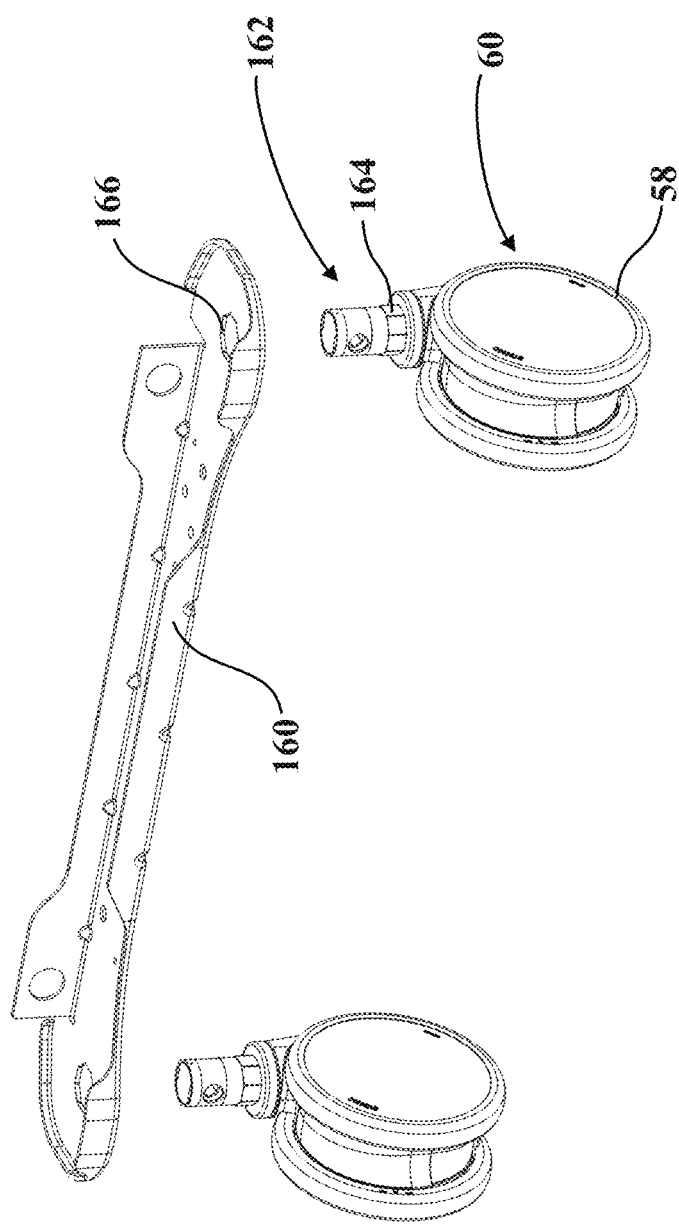
FIG. 14 is a partially exploded, perspective view illustrating connection of caster stems to a bumper, the caster stems having an octagonal feature.
Figure 15:
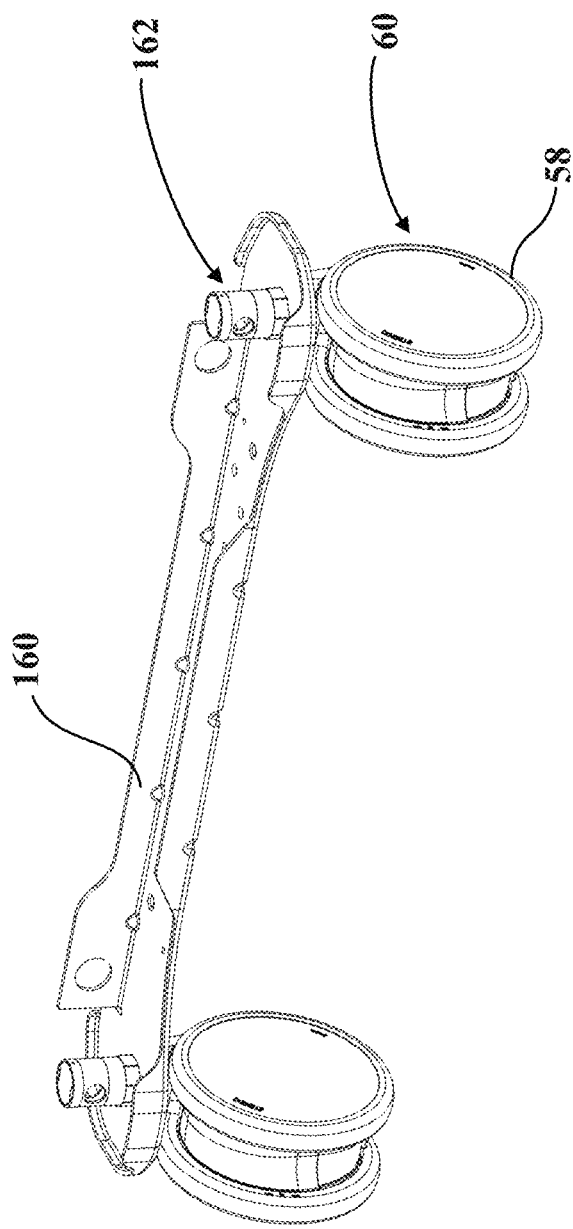
FIG. 15 is a perspective view illustrating the caster stems connected to the bumper.

As shown in FIGS. 14 and 15, each of the casters 60 includes a caster stem 162 coupled to one of the plurality of wheels 58 (or multiple wheels for dual-wheeled casters). The caster stem 162 includes a non-circular interface 164 and the bumper 160 includes mating openings 166 shaped to receive the non-circular interfaces 164 of the caster stems 162 and limit rotation of the caster stems 162 relative to the bumper 160. The bumper 160 may be reinforced (e.g., thicker, ribbed, etc.) at the openings 166 to further support the caster stems 162. In some versions, the non-circular interface 164 includes an octagonal feature at a base of the caster stem 162 that mates into a corresponding octagonal opening in the bumper 160 to prevent rotation of the caster stems 162 relative to the base 34. Other rotation-limiting shapes are also possible.

Figure 16:
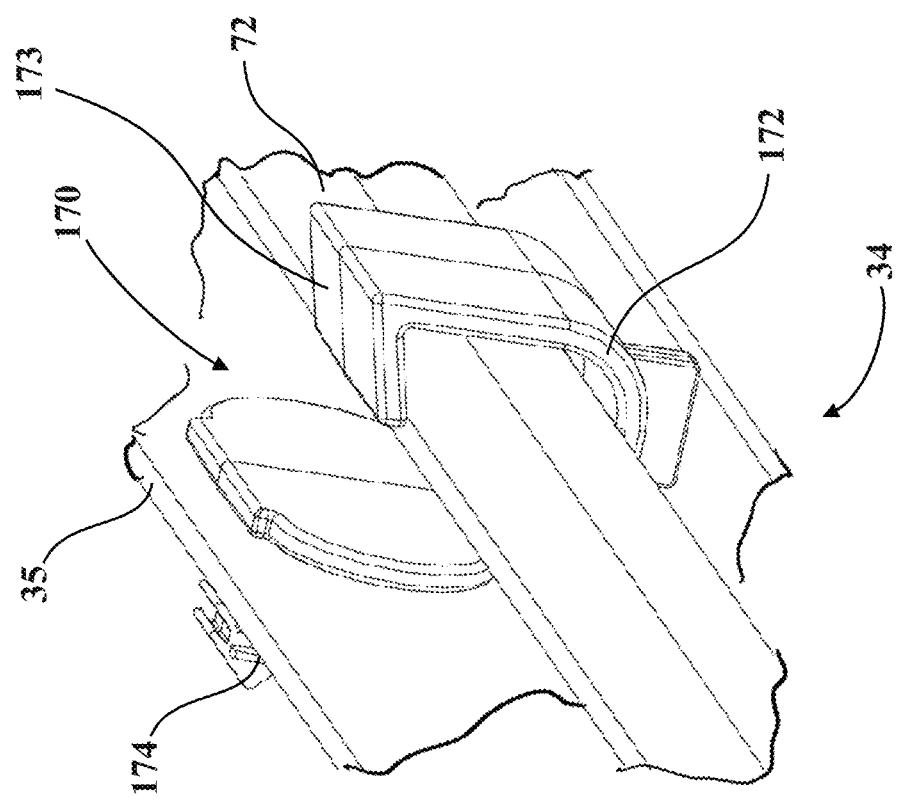
FIG. 16 is a perspective view illustrating a link support supporting a first link.
Figure 17:
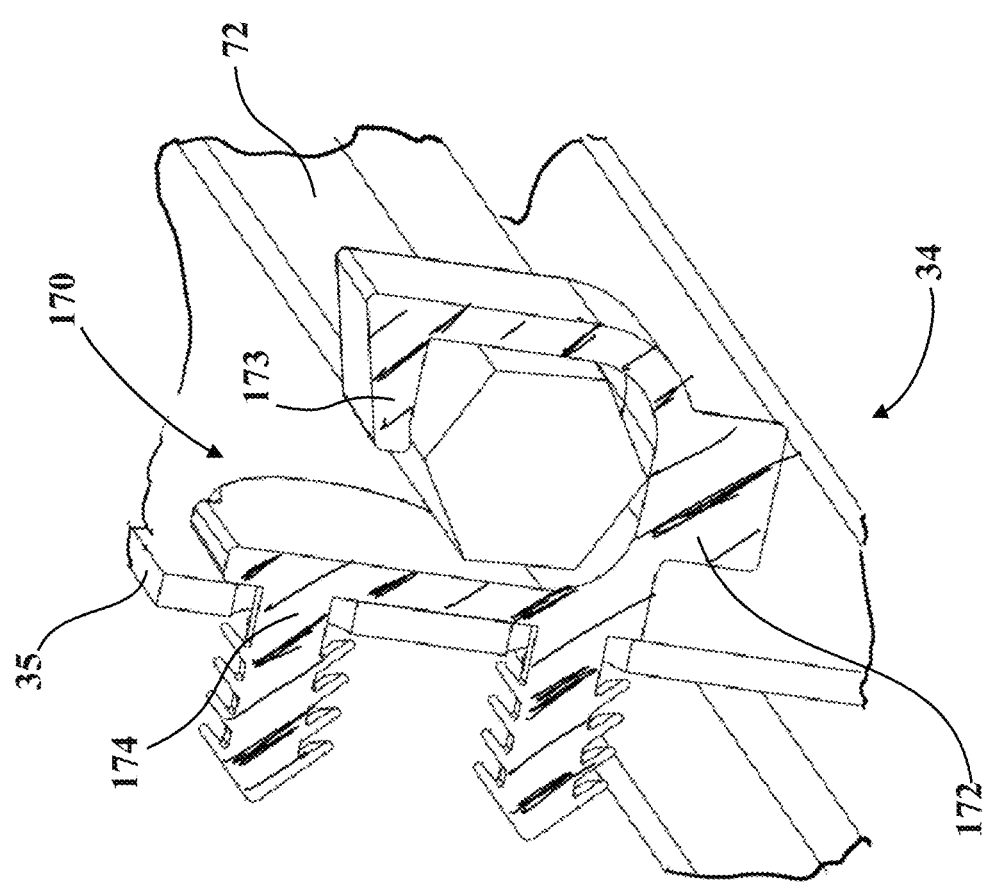
FIG. 17 is a cross-sectional, perspective view illustrating the link support supporting the first link.

Referring to FIGS. 16 and 17, link supports 170 are mounted to the base 34 to rotatably support the first links 72 (one for each of the first links 72). This helps to prevent sagging and rattling of the first links 72 against the base 34 since the first links 72 span longitudinally from one end of the patient transport apparatus 30 to the other end. Each link support 170 may be formed in one-piece of plastic and shaped to capture the first link 72 and space the first link 72 away from the base 34. The link support 170 may have a receiving portion 172 and an attachment portion 174. The receiving portion 172 is C-shaped and substantially surrounds an outer perimeter of the first link 72. The receiving portion 172 may also have a capturing tab 173 that flexes when the receiving portion 172 is being fitted to the first link 72 and prevents the first link 72 from easily popping out of the receiving portion 172. The attachment portion 174 may have fasteners (e.g., christmas tree connectors, screws, pins, clips, or other suitable fasteners) to attach to the base 34 via one or more openings in members of the base frame 35.

Figure 18:
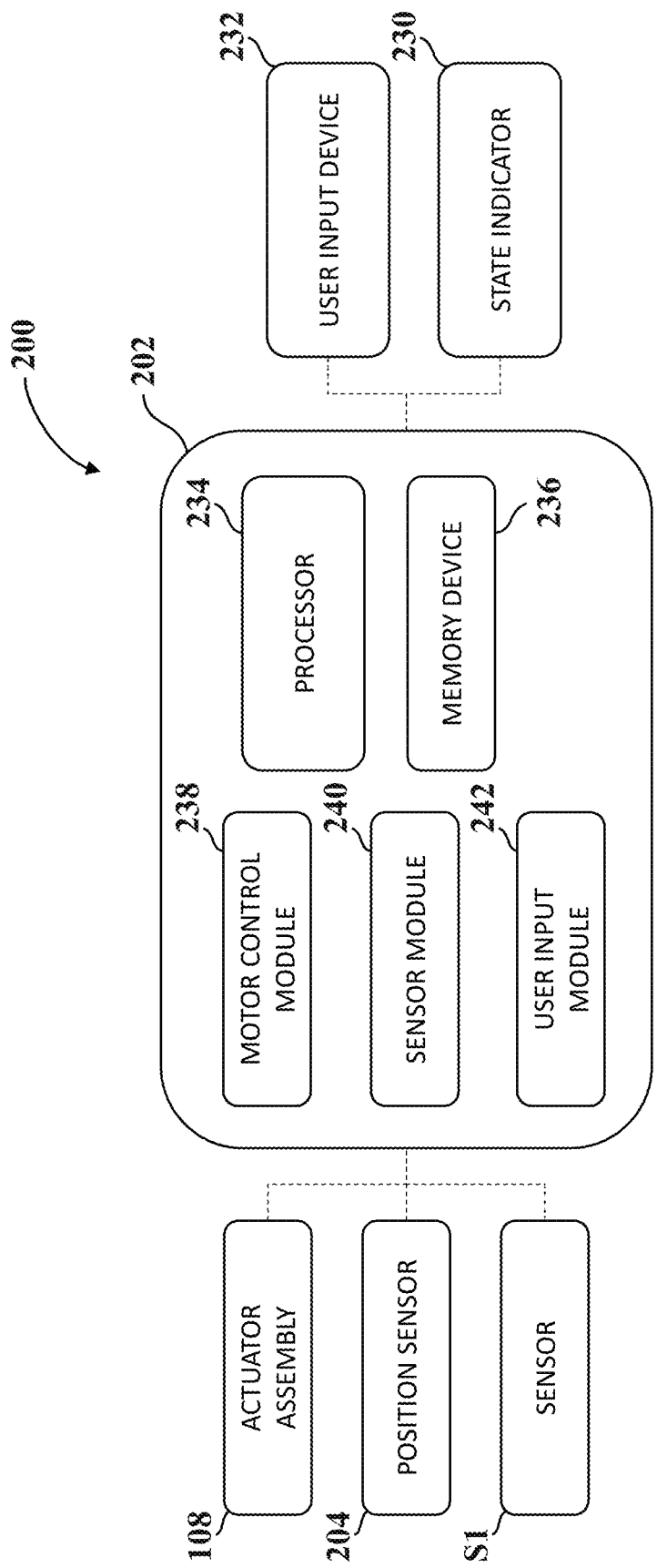
FIG. 18 is a block diagram of components of the electro-mechanical braking system.

Referring to FIG. 18, in the illustrated embodiment, the patient transport apparatus 30 includes a control system 200 to control operations of the electro-mechanical braking system 64. The control system 200 includes the controller 202 having one or more microprocessors, microcontrollers, field programmable gate arrays, systems on a chip, discrete circuitry, and/or other suitable hardware, software, or firmware that is capable of carrying out the functions described herein. The controller 202 may be carried on-board the patient transport apparatus 30 or may be remotely located. In one embodiment, the controller 202 is mounted to the base 34. In other embodiments, the controller 202 is mounted to the footboard 54. Power to the electrical braking assembly 70 and/or the controller 202 may be provided by a battery power supply and/or an external power source. The controller 202 is coupled to the electrical braking assembly 70 in a manner that allows the controller 202 to control the actuator assembly 108 (connections shown schematically in FIG. 18). The controller 202 may communicate with the actuator assembly 108 via wired or wireless connections to perform one of more desired functions.

The control system 200 also includes a position sensor 204 coupled to the controller 202 that is responsive to operation of the linkage 66 to determine the current state of the linkage 66. The position sensor 204 may be mounted to the brakes 62 for sensing a position of the brakes 62. The position sensor 204 may also be coupled to the actuator assembly 108 and configured to measure rotations of the motor 120. The position sensor 204 could also be mounted to the manual actuation shaft 100 and/or the brake pedal 102 to determine a position of the brake pedal 102 and correlate these positions to the braked state, released state, or steer locked state. In the version shown in FIGS. 19 and 21, the position sensor 204 includes a pair of limit switches 206a, 206b that are mounted to a circuit board 208 fixed to the base 34.

Referring, generally, to FIGS. 19-24, a sensor actuator 210 is coupled to the linkage 66 to move with the linkage 66 between the braked state, released state, and/or the steer locked state. The sensor actuator 210 has an actuating head 212 supported by the support structure 32 for sliding movement relative to the limit switches 206a, 206b and an engagement interface 214 carried by the linkage 66 to move with the linkage 66. In the representative embodiment illustrated herein, the engagement interface 214 is realized as a slidable element (or a "slider") as described in greater detail below. However, it will be appreciated that other configurations are contemplated. The engagement interface 214 includes a button connector 216 that fits into a corresponding notch 217 in the second link 74 (see FIG. 10) so that sliding of the second link 74 causes corresponding sliding of the engagement interface 214. The button connector 216 has a stem that fits into the notch 217 in the second link 74 and a head that retains the stem in the notch 217.

Figure 19:
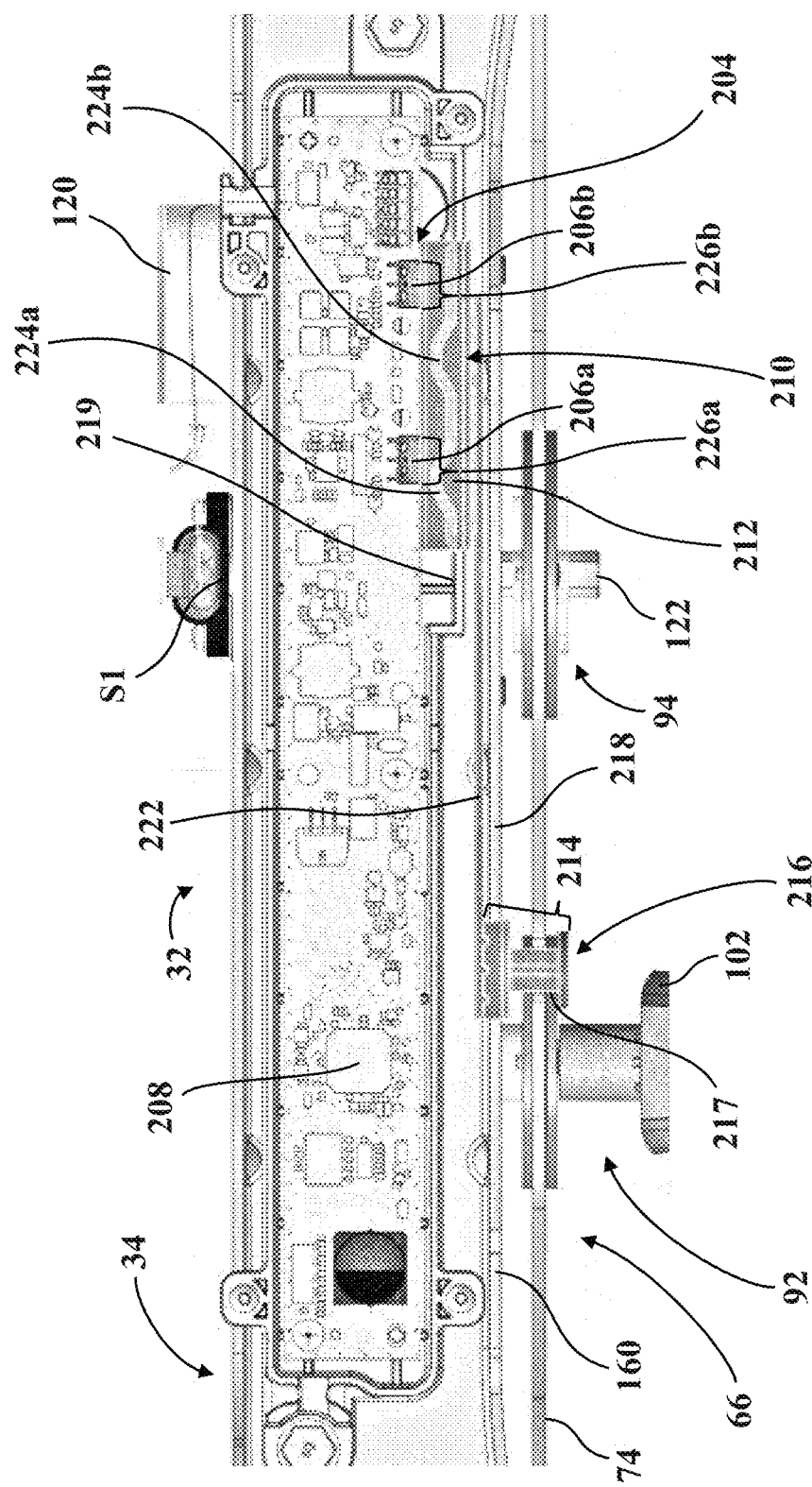
FIG. 19 is a top view of a sensor actuator coupled to the linkage and to the bumper.
Figure 20:
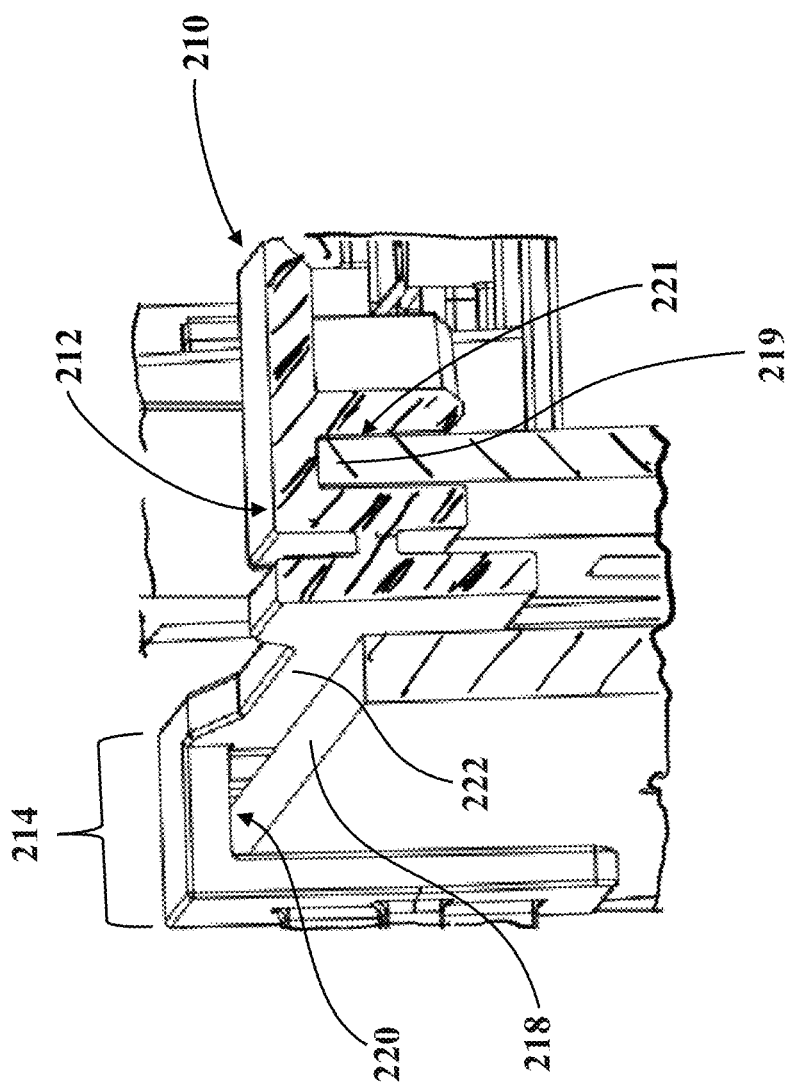
FIG. 20 is a cross-sectional, perspective view illustrating tracks that straddle a bumper guide rail and head guide rail.

As shown in FIGS. 19 and 20, the bumper 160, which forms part of the support structure 32, includes a bumper slide rail 218. The engagement interface 214 defines a first track 220 to straddle and ride along the bumper slide rail 218. An electronics enclosure is fixed to the bumper 160 and includes a head slide rail 219 located at a spaced distance from the bumper slide rail 218. The head slide rail 219 is fixed in position relative to the bumper slide rail 218. The actuating head 212 defines a second track 221 to straddle and ride along the head slide rail 219.

The sensor actuator 210 includes one or more flexible connectors 222 interconnecting the actuating head 212 and the engagement interface 214 so that the actuating head 212 is flexibly connected to the engagement interface 214 to adjust a distance between the actuating head 212 and the engagement interface 214. More specifically, the one or more flexible connectors 222 are flexible to adjust to a distance between the bumper slide rail 218 and the head slide rail 219 to account for manufacturing tolerances in different patient transport apparatuses 30. For example, large tolerances may be specified for manufacture of the bumpers 160, which will result in variations in distances between the bumper slide rail 218 and the head slide rail 219 among different patient transport apparatuses 10 made by the same manufacturer. The one or more flexible connectors 22 are provided to account for such variations.

In some versions, the sensor actuator 210 is formed of plastic (e.g., via injection molding) and the flexible connectors 222 include one or more thin strips of plastic that allow for flexing of the sensor actuator 210. For example, in the version shown in FIGS. 22-24, the flexible connector 222 includes a flexible leg that extends from the actuating head 212 to the engagement interface 214. Alternatively, the actuating head 212 may be coupled to the engagement interface 214 by other resilient members, e.g., springs, rubber connectors, etc., or any other suitable flexible features.

Figure 21:
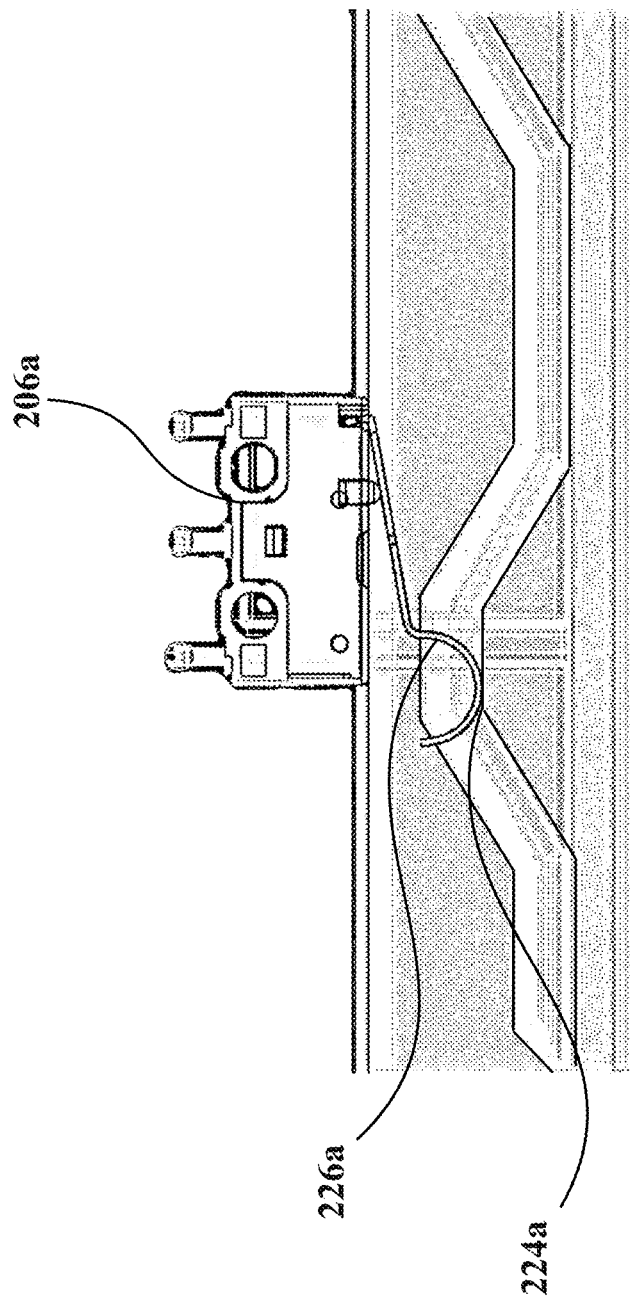
FIG. 21 is top view of a switch engaged by the sensor actuator.
Figure 22:
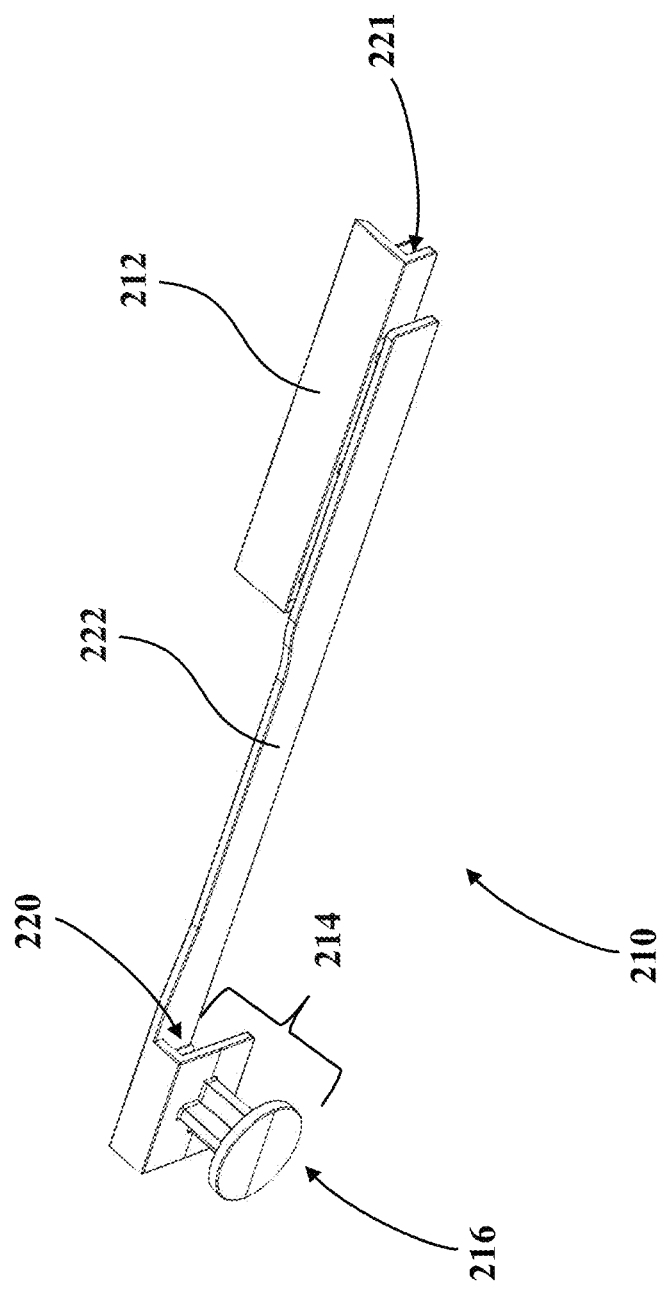
FIG. 22 is a perspective view of the sensor actuator.
Figure 23:
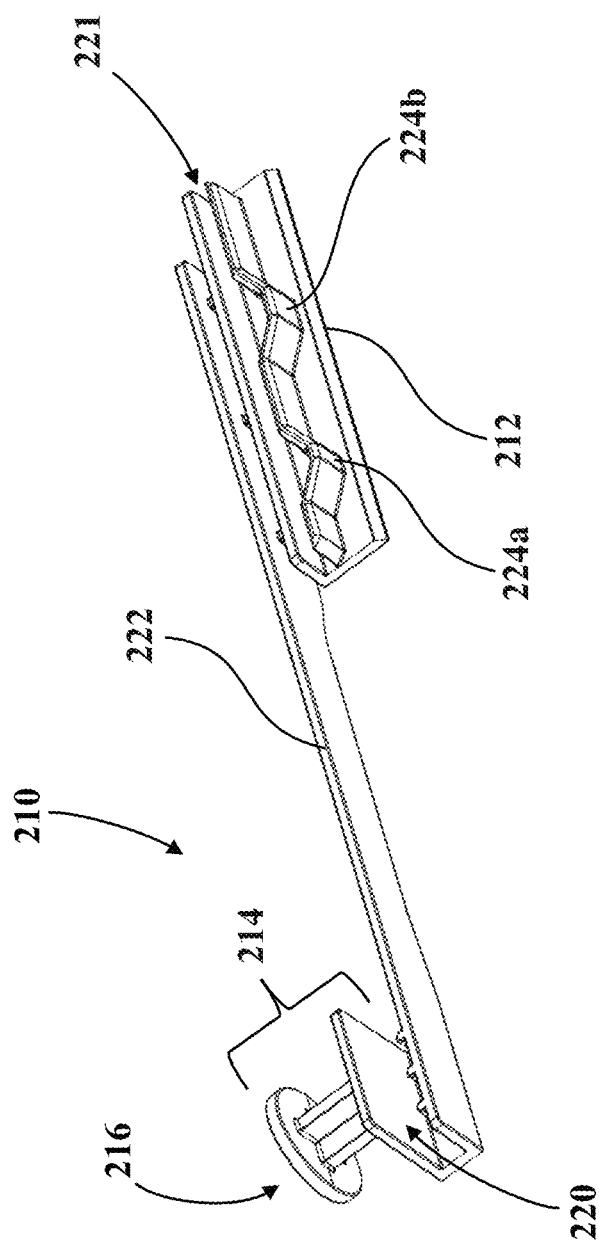
FIG. 23 is another perspective view of the sensor actuator.
Figure 24:
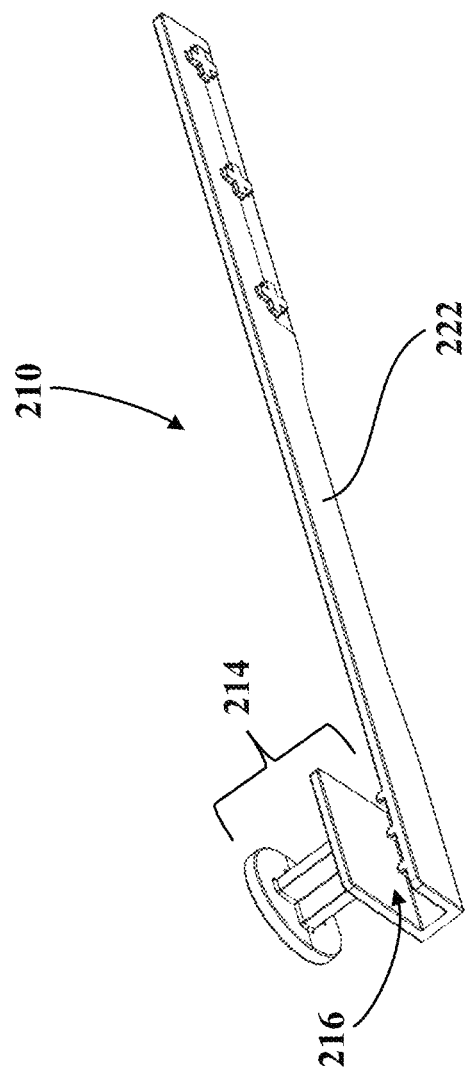
FIG. 24 is a cross-sectional, perspective view illustrating connectors for an actuating head of the sensor actuator.

As best shown in FIGS. 19 and 23, the actuating head 212 includes a plurality of cams, e.g., first and second cams 224a, 224b, to engage first and second arms 226a, 226b of the limit switches 206a, 206b. In the released state (neutral state), as shown in FIGS. 19 and 21, the first cam 224a engages the first arm 226a to activate the associated limit switch 206a, while the second arm 226b remains out of contact with the second cam 224b. When moving to the braked state from the released (or neutral) state, the engagement interface 214 is moved by virtue of the movement of the second link 74, and the first cam 224a slides to the right out of contact with the first arm 226a, while the second cam 224b slides into contact with the second arm 226b to activate the associated limit switch 206b. When moving to the steer locked state from the released (or neutral) state, the engagement interface 214 is moved by virtue of the movement of the second link 74, and the first cam 224a slides to the left out of contact with the first arm 226a, while the second cam 224b continues to be out of contact with the second arm 226b. Thus, the different activation states of the limit switches 206a, 206b enables the controller 202 to determine the current state of the linkage 66.

In some cases, during assembly, it may be difficult to precisely locate the cams 224a, 224b so that the cams 224a, 224b engage the arms 226a, 226b exactly when the electromechanical braking system 64 changes states, e.g., when the brakes 62 are fully engaged or fully released. As a result, if one of the arms 226a, 226b are prematurely contacted, i.e., before a state change actually occurs, then the controller 202 may falsely detect that a state change has occurred, and otherwise cease operation of the actuator assembly 108 before the state change is actually finished, possibly leaving the electro-mechanical braking system 64 in an undesirable state. To avoid incomplete state changes, the controller 202 may be programmed to sample the signals from the limit switches 206a, 206b for a period of time beyond contact of the arms 226a, 226b by the cams 224a, 224b to ensure complete changes in state, e.g., complete activation/deactivation of the brakes 62. For example, with a sample size of 2 and a frequency of 5 ms when the second cam 224b initially slides into contact with the second arm 226b to activate the associated limit switch 206b, the controller 202 recognizes this activation and continues sampling the signals from the limit switch 206b for 10 ms so that the controller 202 continues to drive the motor 120 slightly beyond the activation point (by virtue of reading an active signal for a longer period of time) to ensure the electro-mechanical braking system 64 is in the desired state at which point the motor drive 120 is stopped.

Referring back to FIG. 18, the control system 200 also includes a state indicator 230 that is coupled to the controller 202. The controller 202 is configured to operate the state indicator 230 to indicate the sensed state of the electro-mechanical braking system 64. The state indicator 230 may include one or more visual indicators, audible indicators, and/or tactile indicators to indicate the sensed state. The state indicator 230 may be coupled to the manual brake pedal 102, the base 34, the side rails 44, 46, 48, 50, the headboard or 52 or footboard 54, or any part of the patient transport apparatus 30.

The control system 200 may include a user interface with one or more user input devices 232 that are operated by the caregiver, and which transmit a corresponding input signal to the controller 202. The controller 202 controls operation of the actuator assembly 108 based on the input signal. The user input devices 232 may include any device capable of being actuated by the caregiver. The user input devices 232 may be configured to be actuated in a variety of different ways, including but not limited to, mechanical actuation (hand, foot, finger, etc.), hands-free actuation (voice, foot, etc.), and the like.

The user input devices 232 may also include a gesture sensing device for monitoring motion of hands, feet, or other body parts of the caregiver (such as through a camera), a microphone for receiving voice activation commands, a foot pedal, and a sensor (e.g., infrared sensor such as a light bar or light beam to sense a caregiver's body part, ultrasonic sensor, etc.). Additionally, the user input devices 232 may include buttons/pedals can be physical buttons/pedals or virtually implemented buttons/pedals such as through optical projection or on a touchscreen. The buttons/pedals may also be mechanically connected or drive-by-wire type buttons/pedals where a caregiver applied force actuates a sensor, such as a switch or potentiometer. It should be appreciated that any combination of user input devices 232 may also be utilized. The user input devices 232 may be located on one of the side rails 44, 46, 48, 50, the headboard 52, the footboard 54, or other suitable locations. The user input devices 232 may also be located on a portable electronic device (e.g., iWatch®, iPhone®, iPad®, or similar electronic devices).

In the illustrated embodiment, the controller 202 includes a processor 234 and a memory device 236. Processor 234 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 236 includes a computer readable medium, such as, without limitation, random access memory (RAM), flash memory, a hard disk drive, a solid state drive, a diskette, a flash drive, a compact disc, a digital video disc, and/or any suitable device that enables processor 234 to store, retrieve, and/or execute instructions and/or data.

In the exemplary embodiment, the controller 202 includes a motor control module 238 that is coupled to the actuator assembly 108 to control an operation of actuator assembly 108. The motor control module 238 is configured to execute programming code in response to inputs received by the caregiver via the user interface to operate the actuator assembly 108 based on the user input. In addition, controller 202 also includes a sensor module 240 that is coupled to at least one sensor such as, for example, the sensor S1 and the position sensor 204. The sensor module 240 is configured to received data from the sensors and transmit the received sensor data to the motor control module 238 to facilitate operating the electrical braking assembly 70. Each sensor may transmit a signal continuously, periodically, or only once and/or any other signal timing that enables the controller 202 to function as described herein. Moreover, each sensor may transmit a signal either in an analog form or in a digital form.

The controller 202 also includes a user input module 242 that is configured to receive input signals from the user input devices 232 and/or to generate and display images for display on one or more display devices of the user interface. For example, the user input module 242 may retrieve image data being stored in the memory device 236 and transmit the image data to the user interface to enable one or more display devices to display the images to the caregiver. The user input module 242 also transmits signals to the state indicator 230 to operate the state indicator 230 to indicate the sensed state.

During operation of the electrical braking assembly 70, when a caregiver wishes to engage or release the brakes 62, the caregiver actuates one or more of the user input devices 232. For instance, in the event the caregiver wishes to brake the wheels 58 to stop movement of the patient transport apparatus 30, the caregiver actuates the appropriate user input device 232. Upon actuation, the controller 202 sends output signals to the actuator assembly 108 to cause operation of the actuator assembly 108 to move accordingly. Similarly, one or more of the user input devices 232 can be used to release the brakes 62, or to place the electro-mechanical braking system 64 in the steer locked state.

Figure 25:
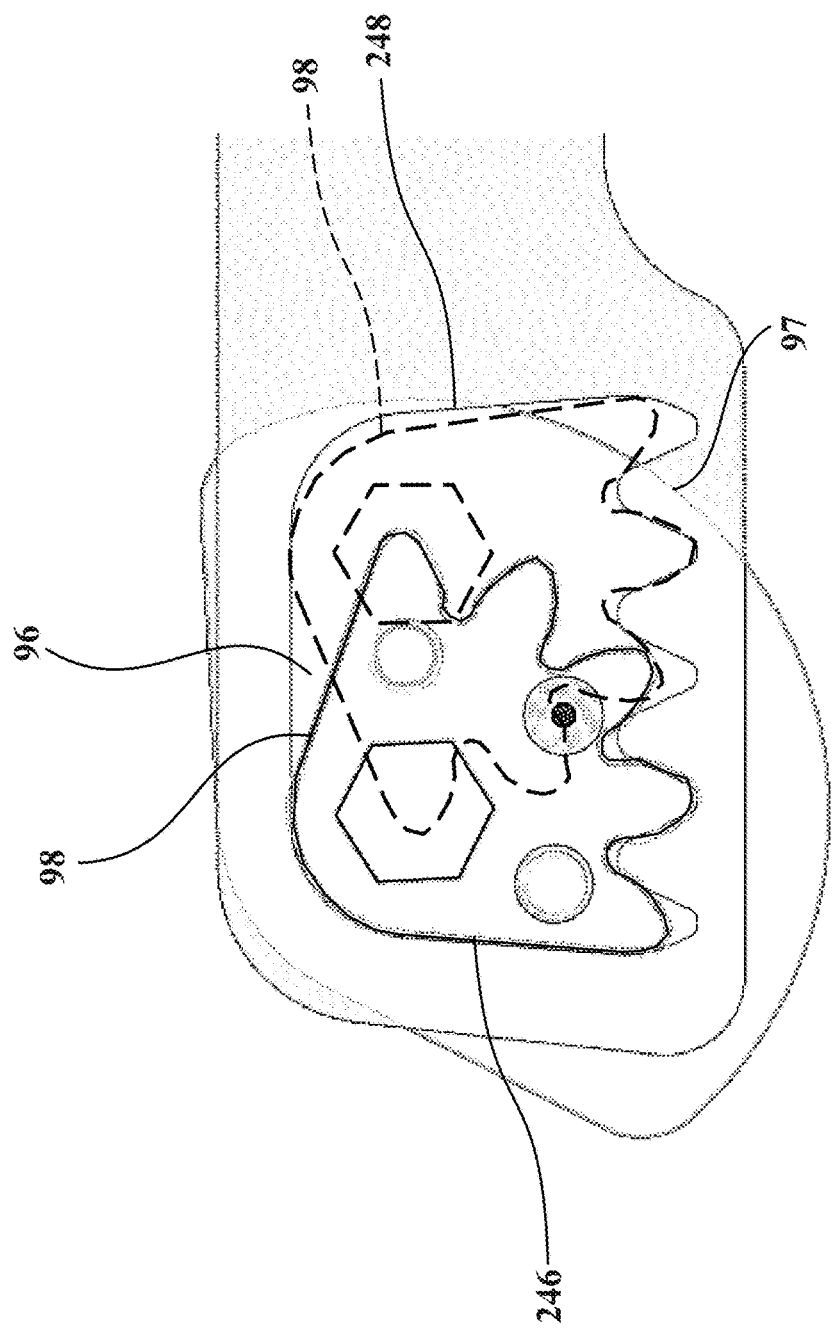
FIG. 25 is an illustration of a sector gear reaching hard stop limits in an elongated slot.
Figure 26:
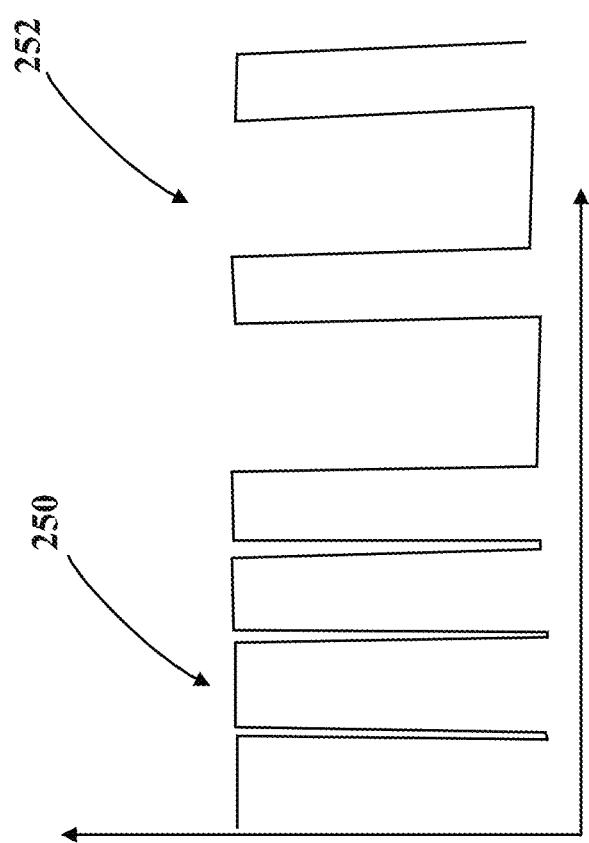
FIG. 26 is a graph of duty cycles over time for a control scheme of the electro-mechanical braking system.

Referring to FIG. 25, in some embodiments, the actuator assembly 108 is driven to a maximum limit by intentionally reaching a hard stop of one or more of the sector gears 98. The hard stop may be provided by the sector gear 98 making hard contact against sides 246, 248 of one or more of the engagement slots 96, i.e., hard contact with a wall of the second link 74 (which, like the sector gears 98, can be formed of metal). For example, the motor 120 drives the linkage 66 until one of the sector gears 98 bears against one of the sides 246, 248 of its corresponding engagement slot 96 as illustrated in FIG. 25, i.e., there is no further travel available for the sector gear 98 in the engagement slot 96. This allows maximum movement of the linkage 66 without any hard stops within the caster assemblies 60 (which can otherwise damage the caster assemblies 60). However, when operating at a high speed and torque, consistently hard stopping the sector gear 98 against the sides 246, 248 of the engagement slot 96 could cause damage to the sector gear 98, the driving member 106, or other components. As a result, it may be desired to reduce the operating speed and/or torque of the motor 120, but this may sacrifice time for engaging or disengaging the brakes 62, for example. Accordingly, referring to FIG. 26, in one embodiment, the controller 202 may initially drive the motor 120 at a first duty cycle 250, e.g., at a 95% duty cycle, using pulse width modulation to move the linkage 66 toward one of the desired states. However, when the electro-mechanical braking system 64 detects that the linkage 66 is nearing the braked state (or starts entering the braked state), for example, the controller 202 instantly begins ramping down the duty cycle to a second duty cycle 252, e.g., a 25% duty cycle.

Nearing (or entering) the braked state can be sensed with the position sensor 204 or other suitable sensor (such as a SPDT switch), which can provide input to the controller 202 to control the motor 120 accordingly. For example, initial activation of the limit switch 206b could indicate nearing (or entering) the braked state and trigger such a change in motor control. Once movement toward the braked state is initially sensed, the linkage 66 can be moved further to ensure full engagement of the brakes 62. For example, the controller 202 may cause the motor 120 to drive for an additional period of time until the hard stop of the sector gear 98 is reached, such as one second, or other suitable time. The hard stop can be sensed by monitoring motor current and detecting a spike in the current associated with such a hard stop. However, by reducing the duty cycle before reaching the hard stop, the associated current and corresponding torque when the hard stop is ultimately reached can be reduced. In some cases, the reduction from the first duty cycle 250 to the second duty cycle 252 can result in a reduction in current associated with the hard stop of from about 6 A to 1.5 A, and an effective reduction in output torque associated with the hard stop of more than 50%.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus comprising:
   a support structure including a base arranged for movement along a floor surface, and a patient support deck to support a patient;
   a movement mechanism configured for selective operation between a first state to at least partially inhibit movement of the base along the floor surface in one or more degrees of freedom, and a second state to permit movement of the base along the floor surface in at least one degree of freedom;
   a linkage operatively attached to the movement mechanism for movement relative to the base in response to changes in operation of the movement mechanism between the first state and the second state;
   a position sensor responsive to operation of the movement mechanism to determine whether the movement mechanism is in the first state or the second state, the position sensor including a plurality of switches; and
   a sensor actuator coupled to the linkage to move with the linkage, the sensor actuator having an actuating head supported by the support structure for movement relative to the position sensor and an engagement interface carried by the linkage to move with the linkage, the actuating head including a plurality of cams to engage the plurality of switches.

2. The patient transport apparatus of claim 1, wherein the sensor actuator comprises one or more flexible connectors interconnecting the actuating head and the engagement interface so that the actuating head is flexibly connected to the engagement interface to adjust a distance between the actuating head and the engagement interface.

3. The patient transport apparatus of claim 2, wherein the support structure includes a rail; and
   wherein the engagement interface defines a track arranged to ride along the rail.

4. The patient transport apparatus of claim 3, wherein the sensor actuator is at least partially flexible to adjust to a distance between the rail and the position sensor.

5. The patient transport apparatus of claim 1, further comprising a wheel assembly coupled to the base and to the linkage; and
   wherein the movement mechanism is configured to move the linkage to brake the wheel assembly during operation in the first state, and to release the wheel assembly during operation in the second state.

6. The patient transport apparatus of claim 1, further comprising a manual operation assembly including a foot pedal operatively attached to the linkage and arranged for selective user engagement to move the linkage to manually change operation of the movement mechanism between the first state and the second state.

7. The patient transport apparatus of claim 6, further comprising an electric operation assembly including a driving assembly having a driving member coupled to the linkage, and an electric motor configured to move the driving member to electrically change operation of the movement mechanism between the first state and the second state.

8. The patient transport apparatus of claim 7, wherein the electric motor of the driving assembly is configured to move the driving member between a first position, a second position, and a home position between the first position and the second position.

9. The patient transport apparatus of claim 8, wherein movement of the driving member to the first position causes the linkage to place the movement mechanism in the first state; and
   wherein movement of the driving member to the second position causes the linkage to place the movement mechanism in the second state.

10. The patient transport apparatus of claim 9, wherein movement of the driving member to the home position allows the linkage to move relative to the driving member to enable manually changing operation of the movement mechanism between the first state and the second state in response to user engagement of the foot pedal.

11. The patient transport apparatus of claim 10, wherein the electric operation assembly includes a drive shaft rotatably coupled to the driving member and disposed in rotational communication with the electric motor.

12. The patient transport apparatus of claim 11, further comprising a sensor assembly to sense movement of the driving member between the first and second positions.

13. The patient transport apparatus of claim 12, wherein the sensor assembly includes a pair of magnets fixed to the drive shaft, and a sensor fixed relative to the base and configured to sense movement of the pair of magnets.

14. The patient transport apparatus of claim 13, wherein the sensor comprises a hall-effect sensor to sense movement of the pair of magnets without contacting the pair of magnets.

15. The patient transport apparatus of claim 1, wherein the linkage includes a first link supported for rotation and operatively attached to a second link supported for sliding movement to change operation of the movement mechanism between the first state and the second state.

16. The patient transport apparatus of claim 15, further comprising a retainer coupled to the support structure and cooperative with the linkage to limit movement of the linkage, the retainer including a stop to engage the first link to limit movement of the first link.

17. The patient transport apparatus of claim 16, wherein the first link comprises an elongated shaft having a hexagonal cross-sectional shape; and wherein the stop comprises a wall arranged to limit longitudinal movement of the elongated shaft.

18. The patient transport apparatus of claim 16, wherein the retainer further includes a guide to receive the second link to limit movement of the second link.

19. The patient transport apparatus of claim 18, wherein the second link comprises a rack and the guide defines a notch to receive the rack and allow sliding movement of the rack in the notch relative to the retainer.

20. The patient transport apparatus of claim 19, wherein the linkage includes a gear operatively coupling the first link to the second link; and wherein the notch is shaped and arranged to receive the gear and allow movement of the gear within the notch in response to movement of the linkage.

* * * * *